US010869202B2

United States Patent
Egner et al.

(10) Patent No.: US 10,869,202 B2
(45) Date of Patent: Dec. 15, 2020

(54) METHOD AND APPARATUS FOR OPTIMIZING SELECTION OF RADIO CHANNEL FREQUENCY AND GEOGRAPHIC LOCATION FOR WLAN ACCESS POINTS

(71) Applicant: Dell Products, LP, Round Rock, TX (US)

(72) Inventors: Will A. Egner, Cedar Park, TX (US); Liam B. Quinn, Austin, TX (US)

(73) Assignee: Dell Products, LP, Round Rock, TX (US)

( * ) Notice: Subject to any disclaimer, the term of this patent is extended or adjusted under 35 U.S.C. 154(b) by 0 days.

(21) Appl. No.: 16/877,470

(22) Filed: May 18, 2020

(65) Prior Publication Data

US 2020/0280860 A1 Sep. 3, 2020

Related U.S. Application Data

(63) Continuation of application No. 15/389,367, filed on Dec. 22, 2016, now Pat. No. 10,659,971.

(51) Int. Cl.
*H04W 88/10* (2009.01)
*H04W 16/18* (2009.01)
(Continued)

(52) U.S. Cl.
CPC .......... *H04W 16/18* (2013.01); *H04W 24/02* (2013.01); *H04W 84/12* (2013.01)

(58) Field of Classification Search
CPC ... H04W 16/18; H04W 72/082; H04W 16/14; H04W 28/18; H04W 52/267;
(Continued)

(56) References Cited

U.S. PATENT DOCUMENTS 7,013,145 B1 3/2006 Centore, III
8,666,048 B2 3/2014 Beerse et al.
(Continued)

OTHER PUBLICATIONS

D. Faria, "Model Signal Attenuation in IEE 802.11 Wireless LANs—vol. 1," Technical Report TR-KP06-0118, Kiwi Project, Stanford University, Jul. 2005, 5 pages.

*Primary Examiner* — Gary Lafontant
(74) *Attorney, Agent, or Firm* — Prol Intellectual Property Law, PLLC; H. Kenneth Prol

(57) ABSTRACT

A system and method includes selecting an optimal geographic location of a WLAN AP via execution of code instructions of a WLAN AP base transceiver location optimization system to determine a first weighted potential interference between the WLAN AP and each of a plurality of neighboring base transceiver systems, associated with a WLAN AP operating at a first geographic location and determine a second weighted potential interference between the WLAN AP and each of a plurality of neighboring base transceiver systems, associated with the WLAN AP operating at a second geographic location that is a candidate optimal geographic location, wherein the determination of the first or second weighted potential interference is based on a spatial-temporal radio frequency profile for a plurality of wireless links operating on the WLAN AP and neighboring base transceiver systems, and if the second weighted potential interference is lesser than the first weighted potential interference, defining the second geographic location as the optimal geographic location of the WLAN AP and determining and displaying the direction of the optimal geographic location from the first geographic location.

20 Claims, 7 Drawing Sheets

(51) Int. Cl.
*H04W 24/02* (2009.01)
*H04W 84/12* (2009.01)

(58) Field of Classification Search
CPC . H04W 72/1231; H04W 84/12; H04W 8/005; H04W 28/0289; H04W 36/20; H04W 52/244; H04W 68/02; H04B 1/10; H04B 1/525; H04B 15/00; H04B 15/04; H04B 7/0691; H04B 1/1027; H04B 1/1036; H04J 11/0023; H04L 5/0037; H04L 5/0073; H04L 27/2646; H04L 27/2647; H04L 5/0023; H04L 25/021; H04L 67/104; Y02D 70/142; Y02D 70/144; Y02D 70/146; Y02D 70/164; Y02D 70/166
See application file for complete search history.

(56) References Cited

U.S. PATENT DOCUMENTS

| | | | |
|---|---|---|---|
| 9,042,361 B2 | 5/2015 | Makhlouf | |
| 9,088,859 B2 | 7/2015 | Egner | |
| 9,119,039 B2 | 8/2015 | Egner | |
| 9,155,082 B2 | 10/2015 | Davydov | |
| 9,167,591 B2 | 10/2015 | Egner | |
| 9,210,668 B2 | 12/2015 | Palanki | |
| 9,210,714 B2 | 12/2015 | Egner | |
| 9,313,603 B2 | 4/2016 | Egner | |
| 2004/0192341 A1 | 9/2004 | Wang et al. | |
| 2005/0041696 A1 | 2/2005 | Pekonen | |
| 2005/0215290 A1 | 9/2005 | Wakabayashi et al. | |
| 2006/0268849 A1 | 11/2006 | Larsson et al. | |
| 2007/0060130 A1 | 3/2007 | Gogic et al. | |
| 2008/0026748 A1* | 1/2008 | Alexander | H04W 24/06 455/432.1 |
| 2009/0181695 A1 | 7/2009 | Wirola et al. | |
| 2009/0279502 A1 | 11/2009 | Zheng et al. | |
| 2009/0319348 A1 | 12/2009 | Khosravy et al. | |
| 2010/0202376 A1 | 8/2010 | Zhu et al. | |
| 2010/0220665 A1 | 9/2010 | Govindan et al. | |
| 2011/0143761 A1 | 6/2011 | Uusitalo et al. | |
| 2012/0057569 A1 | 3/2012 | Xie et al. | |
| 2012/0071160 A1 | 3/2012 | Das | |
| 2013/0023274 A1 | 1/2013 | Meredith et al. | |
| 2013/0137423 A1* | 5/2013 | Das | H04W 12/0802 455/426.1 |
| 2013/0207839 A1 | 8/2013 | Simic | |

* cited by examiner

| Wireless Device Name | Type | Frequency(GHz) | Lat | Long | BTS Utilization |
|---|---|---|---|---|---|
| SmallCell 1 | eNodeB | 5.352 | 30.40054 | -97.66400 | 0.25 |
| AP1 | AP | 5.354 | 30.40043 | -97.66368 | 0.5 |
| SmallCell 2 | eNodeB | 5.356 | 30.40052 | -97.66348 | 0.4 |
| SmallCell 3 | eNodeB | 5.352 | 30.40031 | -97.66334 | 0.3 |
| SmallCell 4 | eNodeB | 5.356 | 30.40017 | -97.66354 | 0.25 |
| SmallCell 5 | eNodeB | 5.252 | 30.40033 | -97.66390 | 0.1 |

METHOD AND APPARATUS FOR OPTIMIZING SELECTION OF RADIO CHANNEL FREQUENCY AND GEOGRAPHIC LOCATION FOR WLAN ACCESS POINTS

This application is a continuation of prior application Ser. No. 15/389,367, entitled "METHOD AND APPARATUS FOR OPTIMIZING SELECTION OF RADIO CHANNEL FREQUENCY AND GEOGRAPHIC LOCATION FOR WLAN ACCESS POINTS," filed on Dec. 22, 2016, which is assigned to the current assignee hereof and is incorporated herein by reference in its entirety.

FIELD OF THE DISCLOSURE

The present disclosure generally relates to a method and apparatus for a radio resources communication management system to select an optimal geographic location for a WLAN access point (AP) operating nearby an unlicensed small cell WWAN base station at an optimized radio channel frequency and an optimized clear channel assessment threshold value.

BACKGROUND

As the value and use of information continues to increase, individuals and businesses seek additional ways to process and store information. One option is an information handling system. An information handling system generally processes, compiles, stores, or communicates information or data for business, personal, or other purposes. Technology and information handling needs and requirements can vary between different applications. Thus information handling systems can also vary regarding what information is handled, how the information is handled, how much information is processed, stored, or communicated, and how quickly and efficiently the information can be processed, stored, or communicated. The variations in information handling systems allow information handling systems to be general or configured for a specific user or specific use such as financial transaction processing, airline reservations, enterprise data storage, or global communications. In addition, information handling systems can include a variety of hardware and software resources that can be configured to process, store, and communicate information and can include one or more computer systems, graphics interface systems, data storage systems, and networking systems. Information handling systems can also implement various virtualized architectures. Data communications among information handling systems may be via networks that are wired, wireless, optical or some combination. Users may choose from among several available radiofrequency communication platforms in information handling systems for data and other communications with other users via communication and data networks.

BRIEF DESCRIPTION OF THE DRAWINGS

It will be appreciated that for simplicity and clarity of illustration, elements illustrated in the Figures are not necessarily drawn to scale. For example, the dimensions of some elements may be exaggerated relative to other elements. Embodiments incorporating teachings of the present disclosure are shown and described with respect to the drawings herein, in which.

DETAILED DESCRIPTION OF THE DRAWINGS

Figure 1:
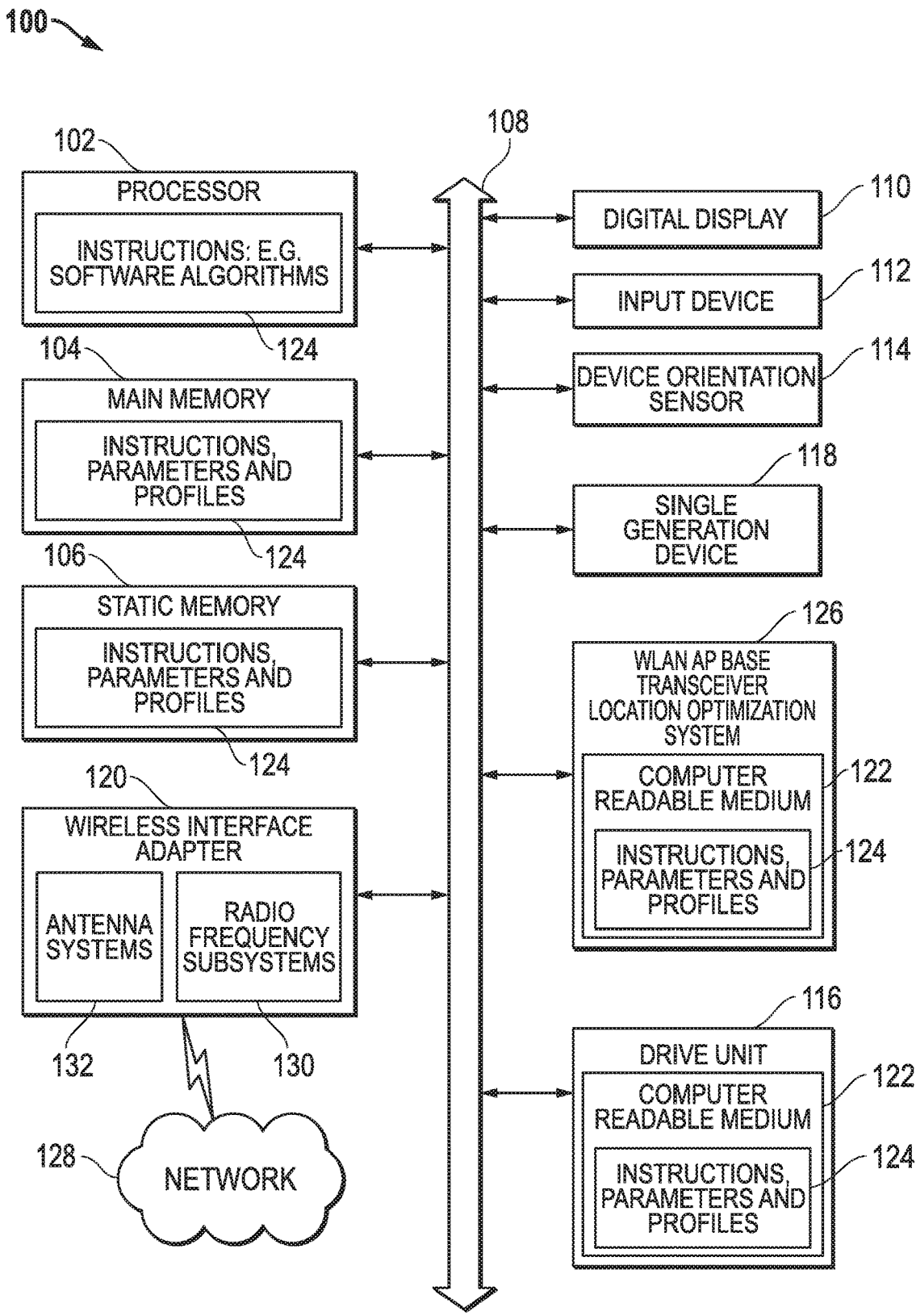
FIG. 1 is a block diagram illustrating an information handling system according to an embodiment of the present disclosure.

The following description in combination with the Figures is provided to assist in understanding the teachings disclosed herein. The description is focused on specific implementations and embodiments of the teachings, and is provided to assist in describing the teachings. This focus should not be interpreted as a limitation on the scope or applicability of the teachings.

As wireless technologies evolve from the 3GPP LTE standard onward, the differences between WLAN (Wi-Fi) services and WWAN (Cellular) radio interfaces are beginning to blur. The wireless technology industry is moving to multi-function heterogeneous radio solutions that will enable always connected platforms wherein WLAN and WWAN communications or other protocols will operate concurrently. As such, there is a need to ensure the wireless links associated with small cell WWAN base station radio interfaces do not interfere with wireless links associated with WLAN AP radio interfaces or similar competing wireless protocols operating in a shared frequency band in the same geographic location. For example, a WLAN AP may be installed in a wireless neighborhood with a plurality of base transceiver stations including other WLAN APs and small cell WWAN base stations. Introduction of the WLAN AP may need to be optimized for selection of a radio channel to avoid interference with pre-existing base transceiver stations. This is particularly true with small cell WWAN stations operating in a distinct protocol from the WLAN protocol such as Wi-Fi. The WLAN AP base transceiver location optimization system of the present disclosure provides a solution to this challenge by determining an optimal geographic location for the WLAN AP operating at an optimized radio channel frequency within the frequency band shared, for example, by a WLAN AP and the nearby small cell WWAN base station radio interfaces, based on an analysis of the weighted potential interference between activities at the WLAN AP radio interface and projected activities at the small cell WWAN base stations. Different protocols on a shared communication band cannot necessarily communicate directly with one another raising a possibility of interference or overlap in communications.

The WLAN AP base transceiver location optimization system of the present disclosure may further instruct the WLAN AP to display a graphical indicator of the direction of the optimized geographic location from the current location of the WLAN AP. Poor placement of the WLAN AP may cause area users to have poor wireless experiences due to increased interference from nearby small cell WWAN base stations. In addition, many individuals installing WLAN AP devices may have varying degrees of technical proficiency, and may not know how to determine the best location of the WLAN AP device so as to decrease the interference from nearby small cell WWAN base stations. The WLAN AP base transceiver location optimization system of the present disclosure calculates the optimal geographic location of the WLAN AP and displaying a graphical indicator prompting an installer to move the WLAN AP toward to the optimal geographic location. It is understood that the embodiments of the present disclosure may also be applied to other wireless protocols occupying shared communication frequency bands. For purposes of discussion herein, an example embodiment is referred to that includes WLAN radio systems and small cell WWAN base station systems operating in a shared, unlicensed frequency band. It can be appreciated that the systems herein may apply to other shared communication frequency bands and other wireless protocols operating concurrently in those bands.

In another embodiment of the present disclosure and described herein, the WLAN AP may also be operating at an optimized preset clear channel assessment value. The current IEEE 802.11 standard, which dictates functionality of WLAN radio interfaces, presets a threshold clear channel assessment value at which each WLAN access point may operate. However, WLAN AP of the present disclosure and unlicensed small cell WWAN base stations in a wireless neighborhood need not adhere to this preset threshold. At the current IEEE 802.11 preset threshold, WLAN access points may only establish wireless links in which the clear channel assessment value for that wireless link is equivalent to or greater than −62 dBm. The introduction of a WLAN AP operating in the same frequency band and within the same geographic location as the unlicensed small cell WWAN base stations also operating in the same frequency band may result in low or no signal quality for wireless links established between the WLAN AP and wireless devices attempting to communicate with the WLAN AP. However, the WLAN AP of the present disclosure may be operating at a modified clear channel assessment threshold that reflects actual conditions of nearby wireless links, rather than adhering to the preset IEEE 802.11 threshold, which may increase the signal quality for wireless links established between the WLAN AP and wireless devices attempting to communicate with the WLAN AP. The clear channel assessment threshold of the WLAN AP may be modified in such a way by setting the clear channel assessment threshold of the WLAN AP to be equivalent to or greater than the lowest measured clear channel assessment of nearby base transceiver stations, less the fade margin of the WLAN AP.

In the embodiments described herein, an information handling system includes any instrumentality or aggregate of instrumentalities operable to compute, classify, process, transmit, receive, retrieve, originate, switch, store, display, manifest, detect, record, reproduce, handle, or use any form of information, intelligence, or data for business, scientific, control, entertainment, or other purposes. For example, an information handling system can be a personal computer, a consumer electronic device, a network server or storage device, a switch router, wireless router, a base transceiver system, or other network communication device, a network connected device (cellular telephone, tablet device, etc.), or any other suitable device, and can vary in size, shape, performance, price, and functionality. The information handling system can include memory (volatile (e.g. random-access memory, etc.), nonvolatile (read-only memory, flash memory etc.) or any combination thereof), one or more processing resources, such as a central processing unit (CPU), a graphics processing unit (GPU), hardware or software control logic, or any combination thereof. Additional components of the information handling system can include one or more storage devices, one or more communications ports for communicating with external devices, as well as, various input and output (I/O) devices, such as a keyboard, a mouse, a video/graphic display, or any combination thereof. The information handling system can also include one or more buses operable to transmit communications between the various hardware components. Portions of an information handling system may themselves be considered information handling systems.

FIG. 1 shows an information handling system 100 capable of administering each of the specific embodiments of the present disclosure. For example, the information handling system 100 can represent unlicensed small cell WWAN base stations, 204-226, or the WLAN AP 202 operating as wireless network access points located anywhere within network 200 of the example embodiment of FIG. 2. In one example embodiment, information handling system 100 may represent a WLAN AP or another wireless network access point. A WLAN AP may execute instructions via a processor for a WLAN AP base transceiver location optimization system according to embodiments disclosed herein. The WLAN AP base transceiver location optimization system of various embodiments of the present disclosure may operate in some example embodiments as a software agent, in whole or in part, within a WLAN AP or other wireless network access point while other portions of the WLAN AP base transceiver location optimization system may operate on remote server systems. Information handling system 100 may also represent a networked server or other system and administer some or all aspects of the WLAN AP base transceiver location optimization system via instructions executed on a processor according to various embodiments herein involving remote operation of such systems.

The information handling system 100 may include a processor 102 such as a central processing unit (CPU), a graphics processing unit (GPU), or both. Moreover, the information handling system 100 can include a main memory 104 and a static memory 106 that can communicate with each other via a bus 108. As shown, the information handling system 100 may further include a digital display unit 110, such as a liquid crystal display (LCD), an organic light emitting diode (OLED), a flat panel display, a solid state display, or a cathode ray tube (CRT). Such a digital display unit 110 may be optional for an information handling system operating as an AP or a base station. Display 110 may include a touch screen display module and touch screen controller (not shown) for receiving user inputs to the information handling system 100. Additionally, the information handling system 100 may include an input device 112, such as a keyboard, and a cursor control device, such as a mouse or touchpad or similar peripheral input device. The information handling system 100 can also include a disk drive unit 116, and a signal generation device 118, such as a speaker or remote control. The information handling system 100 may also include a device orientation sensor 114 capable of determining the orientation of the front of the device with respect to the digital display 110, and may include but may not be limited to an accelerometer and/or a geomagnetic field sensor. The information handling system 100 can include a network interface device such as a wireless adapter 120. The information handling system 100 can also represent a server device whose resources can be shared by multiple client devices, or it can represent an individual client device, such as a desktop personal computer, a laptop computer, a tablet computer, or a mobile Smartphone.

The information handling system 100 can include a set of instructions 124 that can be executed to cause the computer system to perform any one or more of the methods or computer based functions disclosed herein. For example, instructions 124 may execute a WLAN AP base transceiver location optimization system, software agents, or other aspects or components. Similarly instructions 124 may execute the WLAN AP base transceiver location optimization system disclosed herein for managing base transceiver radio interference of competing protocols on a shared communication band. For example, instructions 124 may execute the WLAN AP base transceiver location optimization system disclosed herein to manage a WLAN AP operating at an optimized radio channel frequency and optimized clear channel assessment value by determining an optimized geographic location for the WLAN AP, and transmitting code instructions to the graphical indicator of direction, such as digital display 110 of the WLAN AP to display a graphical indication of the direction of the optimized geographic location from the current geographic location, as described in greater detail below in some embodiments. In other embodiments, a graphical indication of direction may be indicated by a systems of lights, such as LEDs to indicate direction via arrows, color, or light location on the WLAN AP. Various software modules comprising application instructions 124 may be coordinated by an operating system (OS) and via an application programming interface (API). An example operating system may include Windows®, Android®, and other OS types known in the art. Example APIs may include Win 32, Core Java API, or Android APIs. In a further example, processor 102 may conduct monitoring and processing of wireless communication device usage trends by the information handling system 100 according to the systems and methods disclosed herein. The computer system 100 may operate as a standalone device or may be connected such as using a network, to other computer systems or peripheral devices.

In a networked deployment, the information handling system 100 may operate in the capacity of a server or as a client user computer in a server-client user network environment, or as a peer computer system in a peer-to-peer (or distributed) network environment. The information handling system 100 can also be implemented as or incorporated into various devices, such as a personal computer (PC), a tablet PC, a set-top box (STB), a PDA, a mobile information handling system, a palmtop computer, a laptop computer, a desktop computer, a communications device, an AP, a base station transceiver, a wireless telephone, a land-line telephone, a control system, a camera, a scanner, a facsimile machine, a printer, a pager, a personal trusted device, a web appliance, a network router, switch or bridge, or any other machine capable of executing a set of instructions (sequential or otherwise) that specify actions to be taken by that machine. In a particular embodiment, the computer system 100 can be implemented using electronic devices that provide voice, video or data communication. Further, while a single information handling system 100 is illustrated, the term "system" shall also be taken to include any collection of systems or sub-systems that individually or jointly execute a set, or multiple sets, of instructions to perform one or more computer functions.

The disk drive unit 116 may include a computer-readable medium 122 in which one or more sets of instructions 124 such as software can be embedded. Similarly, main memory 104 and static memory 106 may also contain computer-readable medium for storage of one or more sets of instructions, parameters, or profiles 124. The disk drive unit 116 and static memory 106 also contains space for data storage. Further, the instructions 124 may embody one or more of the methods or logic as described herein. For example, instructions relating to the WLAN AP base transceiver location optimization system software algorithms may be stored here. Additionally, wireless communication device usage trend data for the WLAN AP base transceiver location optimization system, interference models or measured interference profiles and wireless link profiles relating to WLAN AP base transceiver location optimization system may be stored here in main memory 104, static memory 106, drive unit 116, or remotely via network 128. Wireless link profiles stored here may include end-user profile data measured by the processor 102 during wireless link usage. Profiles may additionally include crowd sourced spatial-temporal radio frequency profiles for wireless links or for energy link consumption data. Interference profiles may include models relating to locations of transmitters with respect to one another and relate to closeness (or identity) of operating frequencies during concurrent operation with a communication frequency band. In a particular embodiment, the instructions, parameters, and profiles 124 may reside completely, or at least partially, within the main memory 104, the static memory 106, and/or within the disk drive 116 during execution by the processor 102 of information handling system 100. As explained, some or all of the WLAN AP base transceiver location optimization system may be executed locally or remotely. The main memory 104 and the processor 102 also may include computer-readable media.

The network interface device shown as wireless adapter 120 can provide connectivity to a network 128, e.g., a wide area network (WAN), a local area network (LAN), wireless local area network (WLAN), a wireless personal area network (WPAN), a wireless wide area network (WWAN), or other network. Connectivity may be via wired or wireless connection. Wireless adapter 120 may include one or more radio frequency subsystems 130 with transmitter/receiver circuitry, wireless controller circuitry, amplifiers and other circuitry for wireless communications. Each radio frequency subsystem 130 may communicate with one or more wireless technology protocols.

The radio frequency subsystem 130 may contain individual subscriber identity module (SIM) profiles for each technology service provider and their available protocols. Alternatively it may have a software based SIM profile that is reconfigurable. In yet another aspect, the radiofrequency subsystem may include an eSIM for electronic control over activate SIM profile being used depending on the results of wireless link optimization analysis for WLAN AP base transceiver location optimization system and for concurrent radio operation interference modeling or assessment. The wireless adapter 120 may also include antenna system 132 which may be tunable antenna systems for use with the system and methods disclosed herein.

In some aspects of the present disclosure, the wireless adapter 120 may operate a wireless link with a single, shared communication frequency band such as with the 5G standard relating to unlicensed wireless spectrum for small cell 5G next gen operation or for unlicensed Wi-Fi WLAN operation in an example aspect. For example, a 5 GHz wireless communication frequency band may be apportioned under the 5G standards for communication on either small cell WWAN wireless link operation or Wi-Fi WLAN operation as described further below. In some embodiments, the shared, wireless communication band may be transmitted through one or a plurality of antennas. Other shared communication frequency bands are contemplated for use with the embodiments of the present disclosure as well.

In other aspects, the information handling system 100 operating as a wireless communication device may operate a plurality of wireless adapters 120 for concurrent radio operation in one or more wireless communication bands. In the case of a base transceiver station (BTS) system such as a WLAN AP or a WWAN base station, the radio frequency subsystem may serve as a wireless routing system with wireless controllers to manage authentication, connectivity, communications, power levels for transmission, buffering, error correction, baseband processing, and other functions as understood by those of skill. The plurality of wireless adapters 120 may further share a wireless communication band in some disclosed embodiments. The proximity of concurrent radio transmission or reception in a shared band precipitates a need to assess or model interference for concurrently operating wireless communication devices as with the WLAN AP base transceiver location optimization system of the present disclosure. Similarly, the proximity of concurrent radio transmission or reception in a shared band may further precipitate provide a remedy or adjustment to selected wireless link frequency channels or transmission or reception along those wireless channels in view of the WLAN AP base transceiver location optimization system of the present disclosure.

The wireless network in which a BTS operates may have a wireless mesh architecture in accordance with mesh networks described by the wireless data communications standards or similar standards. The wireless adapter 120 may also connect to the external network and to mobile information handling systems via a WPAN, WLAN, WWAN, LPWAN and via a wireless switched Ethernet connection. The wireless data communication standards set forth protocols for communications and routing via these BTS systems, as well as protocols for a variety of other operations, may govern operation. Other operations may include handoff of client devices moving between nodes, self-organizing of routing operations, or self-healing architectures in case of interruption.

The wireless adapter 120 may operate in accordance with any wireless data communication standards. To communicate with a wireless local area network, standards including IEEE 802.11 WLAN standards, IEEE 802.15 WPAN standards, WWAN such as 3GPP or 3GPP2, or similar wireless standards may be used. Wireless adapter 120 may connect to any combination of macro-cellular wireless connections including 2G, 2.5G, 3G, 4G, 5G or the like from one or more service providers. The wireless adapter 120 can represent an add-in card, wireless network interface module that is integrated with a main board of the information handling system or integrated with another wireless network interface capability, or any combination thereof. In an embodiment the wireless adapter 120 may include one or more radio frequency subsystems 130 including transmitters and wireless controllers for connecting via a multitude of wireless links. In an example embodiment, an information handling system may have an antenna system transmitter 132 for 5G small cell WWAN, Wi-Fi WLAN or WiGig connectivity and one or more additional antenna system transmitters 132 for macro-cellular communication. The radio frequency subsystems 130 include wireless controllers to manage authentication, connectivity, communications, power levels for transmission, buffering, error correction, baseband processing, and other functions of the wireless adapter 120.

The radio frequency subsystems 130 of the wireless adapters may measure various metrics relating to wireless communication pursuant to operation of a WLAN AP base transceiver location optimization system as in the present disclosure. For example, the wireless controller of a radio frequency subsystem 130 may manage detecting and measuring received signal strength levels, bit error rates, signal to noise ratios, latencies, jitter, and other metrics relating to signal quality and strength. In one embodiment, a wireless controller may manage one or more radio frequency subsystems 130 within a wireless adapter 120.

In an alternative embodiment, dedicated hardware implementations such as application specific integrated circuits, programmable logic arrays and other hardware devices can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionality as described herein.

The present disclosure contemplates a computer-readable medium that includes instructions, parameters, and profiles 124 or receives and executes instructions, parameters, and profiles 124 responsive to a propagated signal; so that a device connected to a network 128 can communicate voice, video or data over the network 128. Further, the instructions 124 may be transmitted or received over the network 128 via the network interface device or wireless adapter 120.

Information handling system 100 includes one or more application programs 124, and Basic Input/Output System and firmware (BIOS/FW) code 124. BIOS/FW code 124 functions to initialize information handling system 100 on power up, to launch an operating system, and to manage input and output interactions between the operating system and the other elements of information handling system 100. In a particular embodiment, BIOS/FW code 124 reside in memory 104, and include machine-executable code that is executed by processor 102 to perform various functions of information handling system 100. In another embodiment (not illustrated), application programs and BIOS/FW code reside in another storage medium of information handling system 100. For example, application programs and BIOS/FW code can reside in drive 116, in a ROM (not illustrated) associated with information handling system 100, in an option-ROM (not illustrated) associated with various devices of information handling system 100, in storage system 107, in a storage system (not illustrated) associated with network channel of a wireless adapter 120, in another storage medium of information handling system 100, or a combination thereof. Application programs 124 and BIOS/FW code 124 can each be implemented as single programs, or as separate programs carrying out the various features as described herein.

While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding, or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to store information received via carrier wave signals such as a signal communicated over a transmission medium. Furthermore, a computer readable medium can store information received from distributed network resources such as from a cloud-based environment. A digital file attachment to an e-mail or other self-contained information archive or set of archives may be considered a distribution medium that is equivalent to a tangible storage medium. Accordingly, the disclosure is considered to include any one or more of a computer-readable medium or a distribution medium and other equivalents and successor media, in which data or instructions may be stored.

Figure 2:
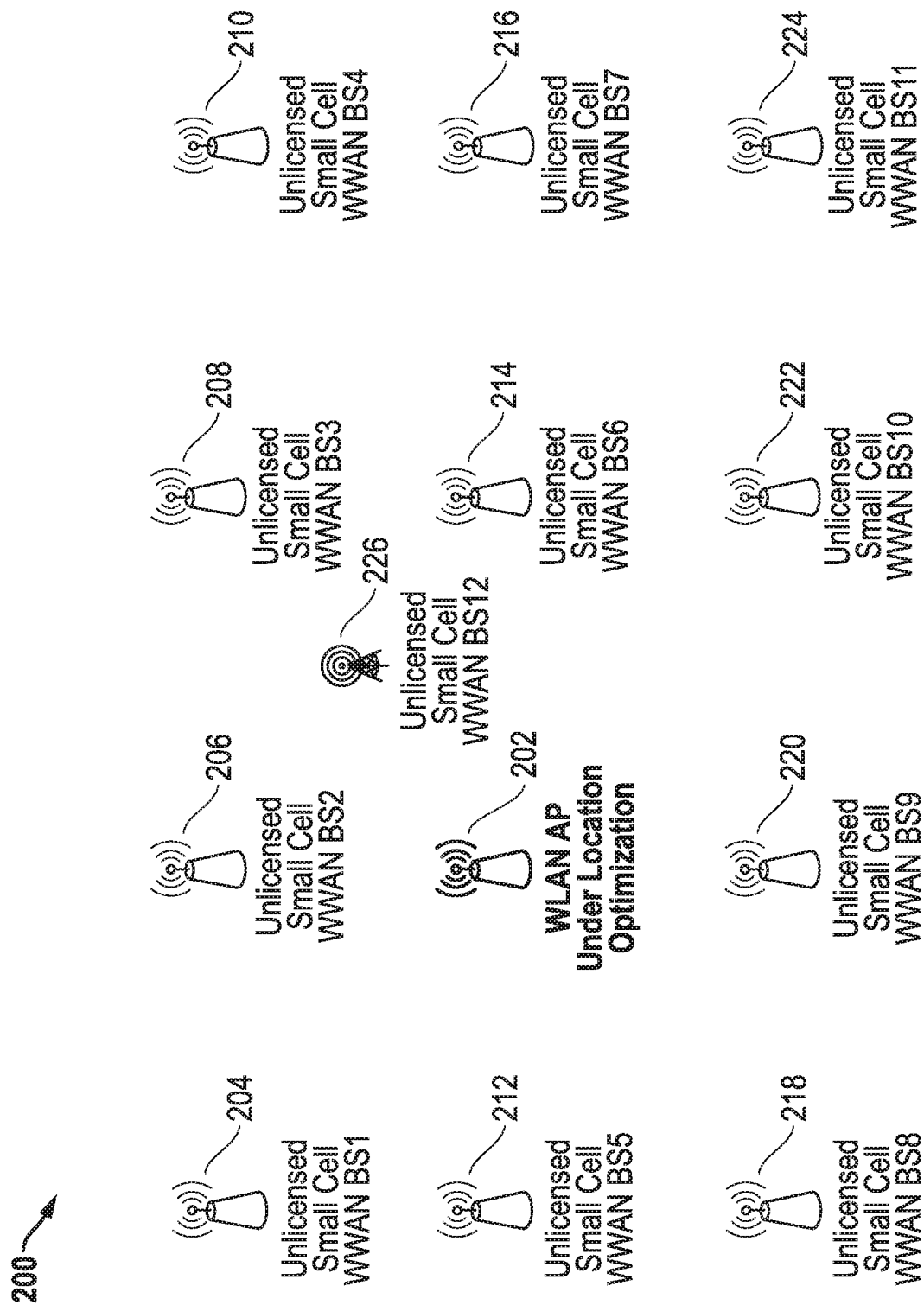
FIG. 2 is a graphic diagram illustrating a network with one or more transceiving information handling systems according to an embodiment of the present disclosure.

FIG. 2 illustrates a wireless neighborhood that can include one or more information handling systems. The wireless neighborhood 200 in an embodiment may be a building, campus, shopping area, airport, or other area having a plurality of competing wireless link options available. In some aspects, the wireless neighborhood may be facilities or a campus associated with an enterprise, military, university, government or municipal organization. Within wireless neighborhood 200 there are a plurality of base transceiver station (BTSs) systems including at least one WLAN AP 202 and several unlicensed small cell WWAN base stations 204-226. The WLAN AP 202 in an embodiment may operate on an unlicensed radio channel frequency within the same, shared frequency band upon which the wireless unlicensed small cell WWAN base stations 204-226 also operate. Specific examples of unlicensed small cell WWAN base stations 204-226 in an embodiment may include, but may not be limited to a femtocell base station such as an eNodeB base station. It is contemplated the unlicensed small cell WWAN base stations 204-226 may also include any other small cell base station operating under protocols beyond the LTE standard such as under emerging 5G technologies.

The wireless local network 200 in an embodiment may take many different known forms. For example, the wireless local network 200 may be the wireless local area network (WLAN), a wireless personal area network (WPAN), or a wireless wide area network (WWAN). Since WPAN or Wi-Fi Direct Connection and WWAN networks can functionally operate similar to WLANs, they may be considered as wireless local area networks (WLANs) for purposes herein. Components of a WLAN may be connected by wireline or Ethernet connections to a wider external network. For example, wireless network access points may be connected to a wireless network controller and an Ethernet switch. Wireless communications across a wireless local area network may be via standard protocols such as IEEE 802.11 Wi-Fi, IEEE 802.11ad WiGig, IEEE 802.15 WPAN, or emerging 5G small cell WWAN communications such as eNodeB, or similar wireless network protocols.

The wireless unlicensed small cell WWAN base stations 204-226 making up the rest of the wireless local network 200 may operate in any number of radio frequency bands, so long as at least one of the unlicensed small cell WWAN base stations 204-226 operates in the same radio frequency band as the WLAN AP 202. The wireless neighborhood 200 may include a variety of macro-cellular base stations of one or more service providers, such as Sprint, Verizon, AT&T, and T-Mobile. Service provider macro-cellular base stations may operate pursuant to 2G standards such as GSM, 2.5G standards such as GSM EDGE and GPRS, 3G standards such as W-CDMA/UMTS and CDMA 2000, 4G standards, or emerging 5G standards including small cell WWAN, WiMAX, LTE, and LTE Advanced, LTE-LAA, and the like. Licensed carriers may include small cell base stations that operate in licensed communication frequency bands and may operate as an anchor wireless link in tandem with operation of unlicensed small cell WWAN wireless links of unlicensed small cell base stations 204-226 as understood. For example, LTE-LAA or emerging 5G systems may operate with such an example embodiment architecture.

Example competing protocols may be local wireless network access protocols such as Wi-Fi, WiGig, and small cell WLAN in an unlicensed, shared communication frequency band. Example communication frequency bands may include unlicensed 5 GHz frequency bands or 3.5 GHz conditional shared communication frequency bands under FCC Part 96. Wi-Fi ISM frequency bands that could be subject to future sharing include 2.4 GHz, 60 GHz, 900 MHz or similar bands as understood by those of skill in the art. Within local portion of wireless network 200, the WLAN AP 202 and the wireless unlicensed small cell WWAN base stations 204-226 may operate under Wi-Fi or WiGig as well as small cell WWAN in emerging 5G technology in various embodiments. This may create issues with interference between the wireless unlicensed small cell WWAN base stations 204-226 and the WLAN AP 202 when concurrent communication on both WLAN and WWAN access may operate within the same communication frequency bands. Such issues may be addressed or mitigated with remedies according to the WLAN AP base transceiver location optimization system according to embodiments herein.

In an example embodiment, the cloud or a remote data center or networked server located within the wireless network 200 may run hosted applications for the WLAN AP 202 or any other BTSs 204-226. For example, a remote data center, a networked server, or some combination of both may operate some or all of a WLAN AP base transceiver location optimization system as disclosed in the present disclosure. This may occur by establishing a virtual machine application executing software to manage applications hosted at the remote data center in an example embodiment. The WLAN AP 202 may be adapted to run one or more applications locally, and to have hosted applications run in association with the local applications at a remote data center or a networked server located within the wireless network 200. For example, the WLAN AP 202 may operate some or all of the WLAN AP base transceiver location optimization system software agent in some embodiments.

The virtual machine application may serve one or more applications of the WLAN AP 202. Thus, the WLAN AP 202 may be running applications locally while requesting data objects related to those applications from a remote data center via the wireless network 200.

Figure 3:
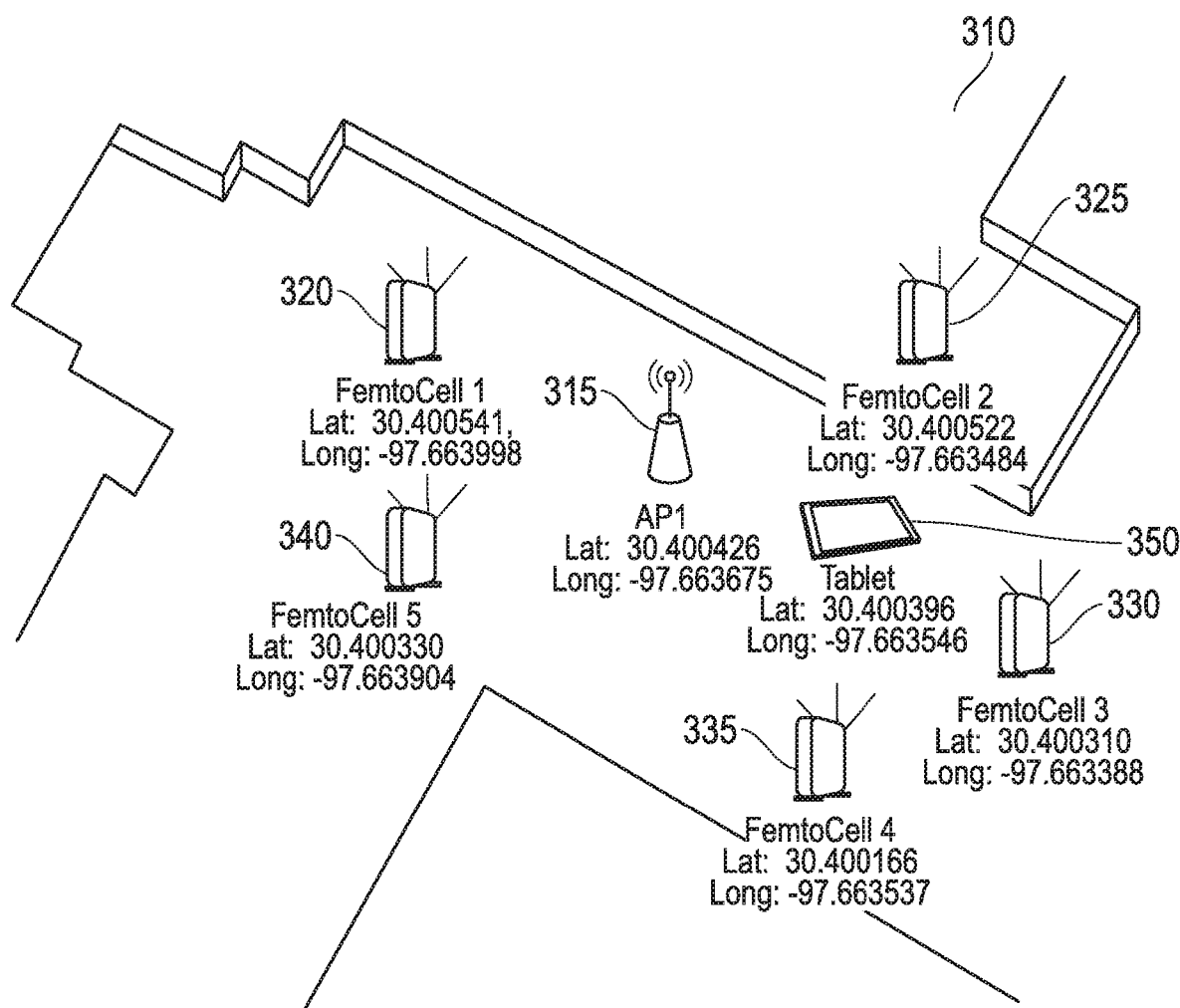
FIG. 3 illustrates a wireless neighborhood in an example embodiment.

FIG. 3 illustrates a wireless neighborhood 310 in another example embodiment. The wireless neighborhood may be a building, campus, shopping area, airport, or other area having a plurality of competing wireless link options available. In some aspects, the wireless neighborhood may be facilities or a campus associated with an enterprise, military, university, government or municipal organization. Within wireless neighborhood 310 there is a plurality of base transceiver systems (BTSs) including several small cell WWAN base stations including smallcell 1 320, smallcell 2 325, smallcell 3 335, and smallcell 5 340. As shown, each of the small cell WWAN base stations may record and report a position including latitude and longitude values. Additionally, in wireless neighborhood 310 is a plurality of WLAN APs such as 315 and 330. WLAN APs 315 and 330 additionally may report a latitude and longitude location information. Reports of location may be made to the WLAN AP base transceiver location optimization system including a concurrent wireless link optimization system. The WLAN AP base transceiver location optimization system may create neighboring interference lists such as 305. Each of the base transceiver devices are listed in the wireless neighborhood and the type of wireless link supported may be determined. Further, neighboring interference lists 305 may include operating channel frequencies and location of each of the wireless link access options that are either APs or small cell WWAN substations in the present embodiment. Finally, the WLAN AP base transceiver location optimization system may establish BTS utilization metrics which may involve estimation of levels or rating of utilization of the WLAN AP and the small cell WWAN substations in the neighboring interference lists 305, including clear channel assessments for each of the base transceiver systems in the wireless neighborhood.

Figure 4:
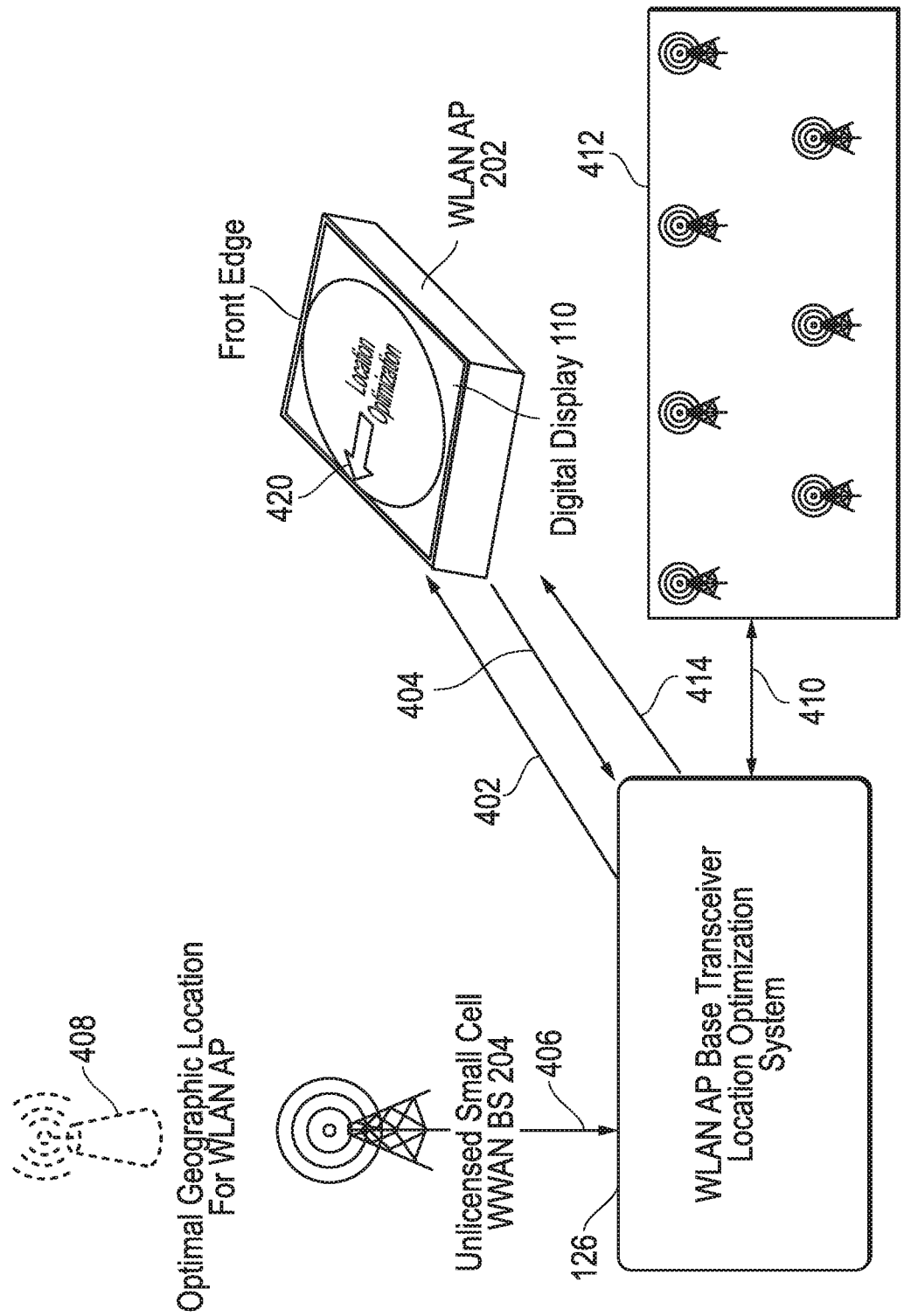
FIG. 4 illustrates communication with various BTSs and the WLAN AP base transceiver location optimization system of the present disclosure according to some embodiments.

FIG. 4 illustrates communication with various BTSs and the WLAN AP base transceiver location optimization system of the present disclosure according to some embodiments. For example, communication is shown between a WLAN AP 202, the WLAN AP base transceiver location optimization system 126, and an unlicensed small cell WWAN base station 204 within a wider wireless network neighborhood according to an embodiment of the present disclosure. In an embodiment, the WLAN AP base transceiver location optimization system 126 may communicate with both the WLAN AP 202 and the unlicensed small cell WWAN base station 204 in order to determine an optimal radio channel frequency upon which the WLAN AP 202 should operate, and a geographic location at which the WLAN AP 202 should operate in order to avoid interference between the WLAN AP 202 and the unlicensed small cell WWAN base station 204. Although FIG. 4 only illustrates communication with one of the plurality of unlicensed small cell WWAN base stations (such as 204-226 in FIG. 2), the WLAN AP base transceiver location optimization system 126 may communicate in the same way with any number of the plurality of unlicensed small cell WWAN base stations 204-226 within the wireless neighborhood.

As shown in FIG. 4, the WLAN AP 202 may incorporate a digital display 110 having a certain orientation, upon which an indicator may be displayed. An indicator may indicate to the user or installer the direction of an optimal geographic location for the WLAN AP 408, as discussed in greater detail below. The indicator may take the form of an arrow 420 displayed upon a digital display 110 of the WLAN AP 202, as shown in FIG. 4, or may take other forms, such as, for example, emitting light from an LED display element located on the side of the WLAN AP 202 closest to the optimal geographic location for the WLAN AP 408.

For example, as shown in FIG. 4, the WLAN AP 202 may incorporate a digital display 110 that may display an indicator in the form of an arrow 420. The WLAN AP may also incorporate a device orientation sensor capable of sensing the orientation of the digital display 110 as slightly tilted up at the front edge of the WLAN AP with respect to the back edge of the WLAN AP, as shown in FIG. 4.

In another embodiment, the WLAN AP 202 may not incorporate a digital display 110, but rather, may incorporate one or more LED display elements distributed at various locations on the WLAN AP 202. For example, the WLAN AP 202 may have one LED display element on each side of the WLAN AP 202. In such an embodiment, the WLAN AP 202 may incorporate a device orientation sensor capable of sensing the orientation of each of the sides of the WLAN AP 202 upon which LED display element may be located.

As shown in FIG. 4, the WLAN AP base transceiver location optimization system 126 may communicate with the WLAN AP 202 and one or more unlicensed small cell WWAN base stations 204 in order to gather information necessary to determine the weighted potential interference between the WLAN AP 202 and the unlicensed small cell WWAN base station 204 within the network. For example, at arrow 402 of FIG. 4, the WLAN AP base transceiver location optimization system 126 may request geographical deployment location of the WLAN AP 202 and information describing the orientation of the digital display 110 of the WLAN AP 202. Placement of the WLAN AP 202 with respect to the location of each of the unlicensed small cell WWAN base stations 204-226 may impact the weighted potential interference between the WLAN AP 202 and each of the unlicensed small cell WWAN base stations 204-226 in an embodiment. At arrow 404 of FIG. 4, the WLAN AP base transceiver location optimization system 126 may receive the geographical deployment location and orientation information from the WLAN AP 202. Upon receipt of RF traffic reports detailing traffic among the plurality of all unlicensed small cell WWAN base stations 204-226 within the network, and the geographic location of the WLAN AP 202, the WLAN AP base transceiver location optimization system 126 may determine the weighted potential interference between the WLAN AP 202 and each of the plurality of unlicensed small cell WWAN base stations 202-226, and, based upon that determination, further determine an optimal geographic location 408 at which the WLAN AP 202 may operate within the network in order to avoid interference with each of the plurality of unlicensed small cell WWAN base stations 204-226, as described in greater detail below. The WLAN AP base transceiver location optimization system 126 may further determine an optimal radio channel frequency upon which the WLAN AP 202 may operate based upon the determined weighted potential interference between the WLAN AP 202 and each of the plurality of unlicensed small cell WWAN base stations 202-226.

In an embodiment, the WLAN AP base transceiver location optimization system may assess channels for potential interference and conflict within the shared communication frequency bands. As shown in FIG. 4 at arrow 406, the WLAN AP base transceiver location optimization system 126 and may receive a neighborhood radio frequency (RF)

traffic report data from the unlicensed small cell WWAN base station 204 detailing the identifications, operating channels, traffic load, signal strength, and locations of all unlicensed small cell WWAN base stations known to the unlicensed small cell WWAN base station 204, as discussed in greater detail above. Alternatively, the WLAN AP base transceiver location optimization system 126 may receive a RF traffic report containing the operating channel, traffic load, signal strength, and location of only the unlicensed small cell WWAN base station 204 delivering the RF traffic report. In such an embodiment, the WLAN AP base transceiver location optimization system 126 may receive a similar RF traffic report from each of the plurality of unlicensed small cell WWAN base stations 204-226 in the wireless network. The WLAN AP base transceiver location optimization system 126 may be physically located within the WLAN AP 202, or may be located at an unlicensed small cell WWAN base station as 204 within the wireless neighborhood remotely located from the WLAN AP.

The WLAN AP base transceiver location optimization system 126 in an embodiment may maintain RF traffic reports relating to unlicensed small cell WWAN base stations (such as 204-226) at a central database of radio interference and traffic analysis (CDRITA). That CDRITA may be located within the wireless network, for example at a remote data center, or at the access point where the WLAN AP base transceiver location optimization system 126 is also located. The CDRITA in an embodiment may aggregate wireless link QoS data across the wireless network and with respect to unlicensed small cell WWAN base stations 204-226 operating with the WLAN AP base transceiver location optimization system of the present disclosure. The CDRITA of the WLAN AP base transceiver location optimization system maintains performance data of service providers and various wireless protocols available for parts of a wireless communication path. The aggregated CDRITA may be accumulated or crowd sourced from multiple unlicensed small cell WWAN base stations 204-226, WLAN AP 202, and/or wireless communication devices operating on a given network or networks within the wider wireless neighborhood.

Further, the WLAN AP base transceiver location optimization system 126 may determine or model interference to be experienced by a selection of wireless links for multiple protocols, or even for a protocol operating on several channels, that operate simultaneously within a radiofrequency communication band. Wi-Fi/WiGig and small cell WWAN protocols, in an example embodiment, may operate in the same shared communication frequency bands. Data relating to neighborhood interference lists, access point and small cell substation locations, and modeled or measured interference during operation of simultaneous wireless links within a shared communication radiofrequency band are stored by the WLAN AP base transceiver location optimization system 126 in a database, at the CDRITA, or at the WLAN AP 202. The WLAN AP base transceiver location optimization system 126 may determine or alter an optimal geographic location at which the WLAN AP 202 should operate, and/or selection of an optimal radio channel frequency upon which the WLAN AP 202 should operate based on assessment of potential interference or collision from selection of those wireless links and the channels within the shared band on which they are operating. In other embodiments, the WLAN AP base transceiver location optimization system 126 may determine or alter the clear channel assessment threshold of the WLAN AP 202, as described in greater detail below.

The CDRITA may include web servers or resources within a cloud environment. For example, the CDRITA can include additional information handling systems, data processing servers, network storage devices, local and wide area networks, or other resources as needed or desired. Having such remote capabilities may permit fewer resources to be maintained at the WLAN AP 202, allowing streamlining and efficiency within that device. Similarly, the CDRITA permits fewer resources to be maintained in other parts of the wireless network.

As also shown in FIG. 4, at arrow 410, the WLAN AP base transceiver location optimization system 126 may receive a clear channel assessment (CCA) of each of a plurality of wireless links established between each of the unlicensed small cell WWAN base stations operating on the optimized radio channel frequency 412 and the WLAN AP base transceiver location optimization system 126.

Clear Channel Assessment (CCA) is a physical carrier sense of the base station which assesses received energy on the radio interface. CCA is composed of two related functions, carrier sense (CS) and energy detection (ED). Carrier sense refers to the ability of the receiver to detect and decode an incoming Wi-Fi signal preamble. The CCA is reported as BUSY when a Wi-Fi signal preamble is detected.

Energy detection refers to the ability of the receiver to detect the non-Wi-Fi energy level present on the current radio channel frequency based on the noise floor, ambient energy, interference sources, and unidentifiable Wi-Fi transmissions that may have been corrupted but can no longer be decoded. Energy detection must sample the medium every slot time to determine if the energy still exists. Energy detection requires a pre-defined threshold that determines if the reported energy level is adequate to report the medium as busy or idle. This threshold is referred to in this disclosure as the clear channel assessment (CCA) threshold.

As described above, the WLAN AP base transceiver location optimization system of this disclosure may increase quality of signals established by the WLAN AP 202 by modifying the preset clear channel assessment minimum threshold of the WLAN AP 202. The current IEEE 802.11 standard, which dictates functionality of WWAN radio interfaces, presets a threshold clear channel assessment value at which each licensed small cell WWAN base station may operate. However, unlicensed small cell WWAN base stations 204-226, and the WLAN AP 202 need not adhere to this preset threshold. At the current IEEE 802.11 preset threshold, licensed small cell WWAN base stations may only establish wireless links in which the clear channel assessment value for that wireless link is equivalent to or greater than −62 dBm. The introduction of unlicensed small cell WWAN base stations 204-226 operating in the same frequency band and within the same geographic location as the licensed WWAN base station or the WLAN AP 202 also operating in the same frequency band may result in low or no signal quality for wireless links established between the WLAN AP 202 and wireless devices attempting to communicate with the WLAN AP 202. However, modifying the clear channel assessment threshold of the WLAN AP 202 to reflect actual conditions of nearby wireless links, rather than adhering to the preset IEEE 802.11 threshold may increase the signal quality for wireless links established between the WLAN AP 202 and wireless devices attempting to communicate with the WLAN AP 202. The WLAN AP base transceiver location optimization system of the present disclosure may modify the clear channel assessment threshold in such a way by setting the clear channel assessment threshold of the WLAN AP 202 to be equivalent to or greater than the lowest measured clear channel assessment of nearby base transceiver stations, less the fade margin of the WLAN AP 202.

In wireless communications, fading is variation of the attenuation of a signal with various variables, including time, geographical position, and radio frequency. The presence of reflectors in the environment surrounding a transmitter and receiver create multiple paths that a transmitted signal can traverse. As a result, the receiver sees the superposition of multiple copies of the transmitted signal, each traversing a different path. Each signal copy will experience differences in attenuation, delay, and phase shift, while travelling from the source to the receiver. This can result in either constructive or destructive interference, amplifying or attenuating the signal power seen at the receiver. Strong destructive interference is frequently referred to as a deep fade and may result in temporary failure of communication due to a severe drop in the channel signal-to-noise ratio.

In order to decrease the deleterious effects of fade on wireless links in a wireless communication system, a design allowance called "fade margin" may be employed. A fade margin technique is a design allowance that provides for sufficient system gain or sensitivity to accommodate expected fading, for the purposes of ensuring that the required quality of service is maintained. Fade margin is often calculated as required for reliable operation of the base station and is often preset by the base station manufacturer.

The WLAN AP base transceiver location optimization system 126 may, at arrow 410 gather information reflecting the CCA measurements of each BTS operating on the optimal radio frequency, as gathered via crowd sourced data, in order to estimate future CCA values for those wireless links. In other embodiments, the WLAN AP base transceiver location optimization system 126 may be located at the WLAN AP 202, and may instruct the WLAN AP 202 to perform real-time CCA measurements of the signals emitted by the plurality of base transceiver stations operating on the optimal radio channel frequency 412. CCA measurements vary over time, and thus, the most recent CCA measurements may provide a more accurate estimation of the most optimal CCA threshold upon which the WLAN AP 202 may operate in order to maximize signal quality.

The WLAN AP base transceiver location optimization system 126 in an embodiment may identify the value of the lowest CCA among the plurality of wireless links established between each of the unlicensed small cell WWAN base stations operating on the optimized radio channel frequency 412 and the WLAN AP base transceiver location optimization system 126.

In an aspect, the WLAN AP base transceiver location optimization system 126 will test a variety of candidate optimal geographic locations 408 in a plurality of direction from the current location of the WLAN AP. Assessment of the potential interference relative to neighboring BTS systems for each candidate optimal geographic location 408 is assessed. A lowest potential interference value or rating will determine an optimal geographic location for the WLAN AP. As shown in FIG. 4, at arrow 414, the WLAN AP base transceiver location optimization system 126 may then transmit machine readable executable code instructions to the WLAN AP 202 instructing it to display an indicator indicating the direction of the optimal geographic location 408 from the current geographic location of the WLAN AP 202. As described above, the indicator may include the arrow 420 displayed upon the digital display 110, or may include any other form of indicator capable of communicating direction of the optimal geographic location 408 with reference to the WLAN AP 202, such as, for example, emitting light from an LED element located on the side of the WLAN AP 202 closest to the optimal geographic location 408. The machine readable executable code instructions transmitted to the WLAN AP 202 at arrow 414 may further include instructions for the WLAN AP 202 to operate on the identified optimal radio channel frequency, and to set its CCA threshold value to be equivalent to or greater than the identified lowest CCA among the plurality of wireless links established between each of the unlicensed small cell WWAN base stations operating on the optimized radio channel frequency 412 and the WLAN AP base transceiver location optimization system 126, minus the margin for signal fading of the WLAN AP 202. In some example embodiments, the WLAN AP base transceiver location optimization system 126 may be operating on the WLAN AP 202 and execute instructions thereon.

In such a way, the WLAN AP base transceiver location optimization system 126 may operate to decrease interference caused by unlicensed small cell WWAN base stations operating in the same frequency band as the WLAN AP 202 on wireless links between the WLAN AP 202 and wireless devices attempting to access the WLAN AP 202. Further, in such a way, the WLAN AP base transceiver location optimization system 126 may decrease the CCA threshold of wireless links between the WLAN AP 202 and wireless devices attempting to access the WLAN AP 202 beyond the fixed CCA threshold established by the IEEE 802.11 standard, as discussed above, thus allowing for the establishment of a greater number of wireless links with the WLAN AP 202.

Figure 5:
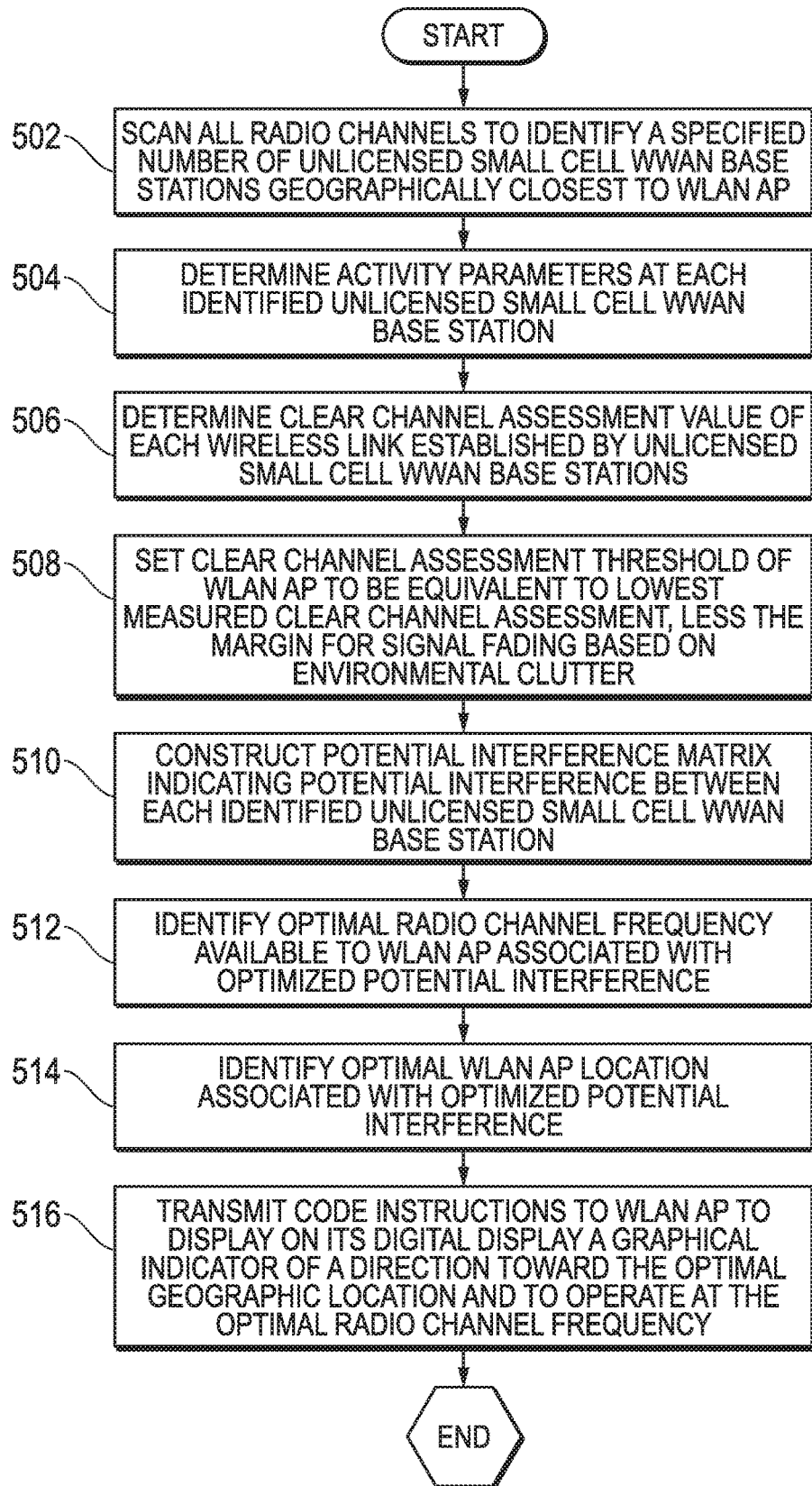
FIG. 5 is a flow diagram illustrating a method of instructing the display of a graphical indication of a direction toward an optimal geographic location according to an embodiment of the present disclosure.

FIG. 5 is a flow diagram illustrating a method of instructing the display of a graphical indication of a direction toward an optimal geographic location according to an embodiment of the present disclosure. A WLAN AP base transceiver location optimization system in an embodiment may employ a method of instructing the display of a graphical indication of a direction toward an optimal geographic location by taking one or more of the following steps: scanning all radio channels to identify a specified number of unlicensed small cell WWAN base stations geographically closest to the WLAN AP, determining activity parameters at each identified unlicensed small cell WWAN base station, determining a clear channel assessment value of each wireless link established by the unlicensed small cell WWAN base stations operating on the optimal radio channel frequency, setting the clear channel assessment threshold of the WLAN AP to be equivalent to the lowest measured clear channel assessment, less the margin for signal fading based on environmental clutter, determining the optimal WLAN AP location, constructing a potential interference matrix indicating potential interference between each identified unlicensed small cell WWAN base station and the WLAN AP, identifying an optimized radio channel available to the WLAN AP associated with the optimized potential interference, identifying an optimal WLAN AP location associated with an optimized potential interference modeled for one or more candidate optimal WLAN AP locations, and transmitting code instructions to the WLAN AP to display on its digital display a graphical indicator of a direction toward the optimal geographic location and to operate at the identified optimal radio channel frequency.

As shown at FIG. 5, at block 502, in an embodiment, the WLAN AP base transceiver location optimization system may scan all radio channels available to the WLAN AP to identify a specified number of unlicensed small cell WWAN base stations geographically closest to the WLAN AP and operating in a shared bandwidth with the WLAN AP. In such a way, the WLAN AP base transceiver location optimization system may identify nearby unlicensed small cell WWAN base stations capable of establishing wireless links that may interfere with wireless links established by the WLAN AP. Location of the nearby unlicensed small cell WWAN base stations is also relevant due to effect of distance between transceivers on the potential interference experienced. The specified number of nearby unlicensed small cell WWAN base stations capable of establishing wireless links that may interfere may be any number greater than zero, and may increase dependent upon the density of base stations in the geographic area in which the WLAN AP operates. For example, the specified number may be smaller in geographical areas such as around a campus in which the distance between the WLAN AP, other WLAN APs, the unlicensed small cell WWAN base stations, and licensed small cell WWAN base stations is greater than similar distances in urban areas. As another example, the specified number may be larger in geographical areas such as in an office building or mall in which the distance between the WLAN AP, other WLAN base stations, the unlicensed small cell WWAN base stations, and licensed small cell WWAN base stations is smaller.

At block 504, in an embodiment, the WLAN AP base transceiver location optimization system may determine the activity parameters at each identified unlicensed small cell WWAN base station, including but not limited to the location, operating radio channel frequency, radio frequency traffic load, signal strength, and module type of each unlicensed small cell WWAN base station. The WLAN AP base transceiver location optimization system may receive wireless link radio frequency broadband traffic reports. In an example embodiment, the wireless link radio frequency broadband traffic reports may be retrieved from the CDRITA as described above. For location and time, available radio technologies and, where relevant, available service providers may be listed for a wireless communication neighborhood. The reports contain data relating to location, time, channel operating frequency and a radio frequency profile of given radio technologies. The radio frequency profile data may also include an associated confidence of estimate for link ratings or QoS scores for BTSs. The wireless link radio frequency profile may combine recent reports, historical traffic reports, as well as data measured via an active device radio frequency scan. As described above, the WLAN AP base transceiver location optimization system of the present disclosure may utilize crowdsourced feedback on QoS for wireless network connections or various links from BTSs within the wireless neighborhood. The wireless link radio frequency broadband traffic report for wireless links partially comprises a spatial-temporal radio frequency profile for the wireless links.

The baseline wireless link radio frequency broadband traffic report may be supplemented or superseded by any fresh or historical mobile traffic reports to assist in selecting an optimal radio channel frequency for the WLAN AP. Recent or historic radio frequency profiles for time period and location zone may be used to update or supplement the wireless link mobile broadband traffic reports. More recent data may be of greater relevance however. For example, the link ratings in a radio frequency profile may utilize recently measured RSSI values instead of estimated values.

Mobile broadband traffic reports are aggregated via crowd sourcing. They may be categorized by location zone and have time and date stamps to identify freshness. Crowd sourcing of information will enhance the availability of accurate data for location zones and times of wireless communication device operation. For example, if a wireless communication device makes a request for a fresh mobile broadband traffic report, the central server database may have reports from other wireless communication devices with recent timestamps. Alternatively, the central server database may make a request for a recent mobile broadband traffic report from wireless communication devices in the same location. Whether via recent storage in the central database (CDRITA) or via a recent request of fresh crowd sourced mobile broadband traffic reports, such a report may avoid the need for the wireless communication device to conduct a radio frequency scan itself.

If there are not enough reliable historical mobile broadband traffic reports recent enough to base a wireless link assessment upon, the WLAN AP base transceiver location optimization system may initiate a wireless communication device radio frequency scan. This scan collects data regarding possible wireless links. This radio frequency scan consumes power and processor resources so should be used sparingly, however it provides up-to-date key performance indicators (KPI) for a new radio frequency profile to be used in a mobile broadband traffic report. Based upon this new mobile broadband traffic report, the system provides a wireless link performance profile to be used by the WLAN AP base transceiver location optimization system.

Additionally, interference experienced at the BTS may be modeled due to distances between BTS systems such as the WLAN AP or among the small cell WWAN base stations. Further, assessment of channel frequencies that the BTS system in the wireless neighborhood are operating is a further factor indicative of interference and useful in modeling or assessing interference levels. In an example embodiment, BTS systems operating in the same shared communication frequency band will be assessed for whether operation occurs on a same channel or adjacent channels within the shared communication band. Same channel operation may yield direct interference among BTSs systems, especially those that are situated geographically close. Similarly, adjacent channel operation within a shared communication band may experience greater interference due to roll-off levels of transmitted energy from a channel frequency range into an adjacent channel. Channel frequency ranges are established ranges of frequencies. However, the edges are not perfect transitions as understood by those of skill due to bandpass limitations. Accordingly, roll-off into adjacent channels may cause interference which may be increased when BTSs are geographically close.

The scan or test of radio frequency links may be conducted by the WLAN AP base transceiver location optimization system. As a first measure, received signal strength, clear channel assessment (CCA), and bandwidth availability for a service provider and a protocol are determined. Then a test of radio frequency data capacity is made. This can test upload and download performance for each protocol. For example, a standard test data volume may be sent via a wireless link to a test server location. Similarly, a test data volume may be received from a server location by the wireless communication device via the wireless link. Latency of response, upload and download speed or throughput can then be measured for the BTS and protocol. The data is associated with a location zone and stamped with a time and date. The type of transmitter/receiver or wireless communication device may also be recorded. This data set provides a wireless link radio frequency profile that may become part of a mobile broadband traffic report. Upon measuring this data for a location, the report may be shared or published by the WLAN AP base transceiver location optimization system.

At block 506, in an embodiment, the WLAN AP base transceiver location optimization system may determine a clear channel assessment value of each wireless link established by the unlicensed small cell WWAN base stations operating nearby. A Clear Channel Assessment (CCA) is a physical carrier sense of the base station which listens to received energy on the radio interface, and is composed of two related functions, carrier sense (CS) and energy detection (ED). Energy detection requires a pre-defined threshold that determines if the reported energy level is adequate to report the medium as busy or idle. This threshold is referred to in this disclosure as the clear channel assessment (CCA) threshold.

As described above, the WLAN AP base transceiver location optimization system of this disclosure may increase quality of signals established by the WLAN AP by modifying the preset clear channel assessment minimum threshold of the WLAN AP. Adaptation of dynamic clear channel assessment by WLAN APs will allow BTS systems to more efficiently reuse spectrum and increase network capacity for a location with predominate strong WLAN signal, such as at an enterprise campus environment. In other cases, where the neighboring WLAN signals are predominately weaker (such as outdoor venues), the dynamic clear channel threshold algorithm also allows the small cell WWANs to avoid packet collisions by listen more carefully for neighboring WLAN uses and thus not transmitting over the top of these weaker WLAN users.

The current IEEE 802.11 standard, which dictates functionality of WLAN radio interfaces, presets a threshold clear channel assessment value at which each WLAN AP may operate. However, the WLAN AP and unlicensed small cell WWAN base stations need not adhere to this preset threshold. At the current IEEE 802.11 preset threshold, unlicensed WLAN APs may only establish wireless links in which the clear channel assessment value for that wireless link is equivalent to or greater than −62 dBm. The introduction of the WLAN AP and unlicensed small cell WWAN base stations operating in the same frequency band and within the same geographic location as the licensed WWAN base station or other WLAN access points also operating in the same frequency band may result in low or no signal quality for wireless links established between WLAN AP and wireless devices attempting to communicate with the WLAN AP. However, modifying the clear channel assessment threshold of the WLAN AP to reflect actual conditions of nearby wireless links, rather than adhering to the preset IEEE 802.11 threshold may increase the signal quality for wireless links established between the WLAN AP and wireless devices attempting to communicate with the WLAN AP. The WLAN AP base transceiver location optimization system of the present disclosure may modify the clear channel assessment threshold in such a way by setting the clear channel assessment threshold of the WLAN AP to be equivalent to or greater than the lowest measured clear channel assessment of nearby base transceiver stations, less the fade margin of the WLAN AP.

As discussed above, the WLAN AP base transceiver location optimization system may receive wireless link radio frequency broadband traffic reports which may report the radio channel frequency at which each of the plurality of unlicensed small cell WWAN base stations is operating, and may also include clear channel assessments (CCAs) of the wireless links established by each of the plurality of unlicensed small cell WWAN base stations operating within the wireless network. The WLAN AP base transceiver location optimization system may determine the CCAs for wireless links established by each of the nearby unlicensed small cell WWAN base stations. As described above, the WLAN AP base transceiver location optimization system may gather information reflecting the CCA measurements of each BTS operating on the optimal radio frequency, as gathered via crowd sourced data, in order to estimate future CCA values for those wireless links. In other embodiments, the WLAN AP base transceiver location optimization system may be located at the WLAN AP, and may instruct the WLAN AP to perform real-time CCA measurements of the signals emitted by the plurality of small cell WWAN base stations operating on the optimal radio channel frequency. In such an embodiment, the WLAN AP base transceiver location optimization system may measure the clear channel assessment values of each of the unlicensed small cell WWAN base stations by directly pinging each unlicensed small cell WWAN base stations nearby.

At block 508 in an embodiment, the WLAN AP base transceiver location optimization system may set the clear channel assessment threshold of the WLAN AP to be equivalent to the lowest measured clear channel assessment, less the margin for signal fading based on environmental clutter. As described above, in wireless communications, fading is variation of the attenuation of a signal with various variables, including time, geographical position, and radio frequency. The presence of reflectors in the environment surrounding a transmitter and receiver create multiple paths that a transmitted signal can traverse. As a result, the receiver sees the superposition of multiple copies of the transmitted signal, each traversing a different path. Each signal copy will experience differences in attenuation, delay, and phase shift, while travelling from the source to the receiver. This can result in either constructive or destructive interference, amplifying or attenuating the signal power seen at the receiver. Strong destructive interference is frequently referred to as a deep fade and may result in temporary failure of communication due to a severe drop in the channel signal-to-noise ratio.

At block 510, in an embodiment, the WLAN AP base transceiver location optimization system may construct a potential interference matrix indicating potential interference between each identified unlicensed small cell WWAN base station. As described above, the WLAN AP base transceiver location optimization system may communicate with the WLAN AP and each unlicensed small cell WWAN base station operating in the wireless neighborhood in order to gather information necessary to determine the weighted potential interference between the WLAN AP and the unlicensed small cell WWAN base stations within the wireless neighborhood. For example, the WLAN AP base transceiver location optimization system may request and receive traffic reports describing the type, frequency of operation, latitude, longitude, and utilization (bandwidth being used, or traffic at the access point) of each unlicensed small cell WWAN base station in the wireless neighborhood. The WLAN AP base transceiver location optimization system may utilize the information in these traffic reports to calculate potential interference between each of the identified unlicensed small cell WWAN base stations. Alternatively, the WLAN AP base transceiver location optimization system may base the calculation in part on these reports, while operating under an assumption of 100% traffic, or full usage of each of the small cell WWAN base stations. The potential interference between an AP and any unlicensed BTS systems is a function of path loss distance (dependent upon geographic locations of each access point), frequency of operation of the first base station, frequency of operation of the second base station, and module type of each base station).

If the BTS systems are under enterprise control, the path loss between an AP and neighboring BTS systems may be estimated using a radio sounding technique in which each neighboring BTS systems are commanded to operate at the designated frequency, one at time, and the AP listens to the level of interference at each potential neighboring BTS. A complete interference matrix can be achieved with the potential of each BTS that is operating on each potential radio frequency channel. From this sounding technique the effective interference generated to the AP at its deployment location may be recorded.

If the neighboring BTS systems are not under enterprise control, then effective inference from each neighbor BTS system to the AP may be estimated using the following technique. The WLAN AP base transceiver location optimization system may command the AP to listen to each of the potential BTS channels. For each channel, the WLAN AP base transceiver location optimization system may detect how many different BTS systems are operating in the channel. If multiple BTS are operating, listen over an extended period and separate different BTS contributions to levels of interference. Once interference is estimated for each neighbor BTS, then move to the next channel and repeat the process.

An alternative method to estimate potential interference can also be achieved through pass loss model utilizing distance(d) and path loss exponential(Alpha) with information relating to the location of the BTS systems in the wireless neighborhood. In this scenario the location of each BTS system may be discerned through a BTS location broadcast or through an external BTS database that delivers location of particular BTS. Application of the following relationship provides a modeled estimation of potential interference:

Mean Potential Interference=Max Power Transmitted at $AP-10*Alpha*\log 10(d)$.

The Max Power Transmission level for each BTS system may be determined using a look up table for a particular BTS in the wireless neighborhood. Note the BTS system model types may be identified though MAC IDs. If BTS model type is unknown, then the maximum transmission can be assumed to be the federally regulated maximum for a particular band. For example, in 5.735-5.815 GHz the maximum effective isotropic radiated power (EIRP) is 53 dBm. In another example, in 5.17-5.25 GHz the maximum EIRP is only 30 dBm.

As describe previously, this potential interference is weighted by BTS channel utilization. The BTS channel utilizations may also be measured and stored during different periods of times so that different interference level may influence on optimal small cell WWAN frequency channels for selection during different times of the day.

The WLAN AP base transceiver location optimization system may base the creation of the potential interference matrix on key performance indicators (KPI). Key performance indicators (KPI) comprise a spatial-temporal radio frequency profile. Data such as received signal strength (RSSI), signal-to-noise ratios (SNR), or signal to interference ratios (SIR) may be relevant channel quality indicators in a KPI matrix. Other data may include data throughput speeds, communication latencies, jitter, and packet loss measurements. The WLAN AP base transceiver location optimization system may actively assess the quality of wireless links being used on each AP. For example using baseline estimated received signal strength indicators (RSSI), a link rating may be computed as follows in one embodiment:

Link Rating $(i,j)$=MAX (MIN (100%,(Estimated RSSI−Minimum Signal)/Max RSSI signal− Minimum RSSI signal,0%), where $i$ is a technology index and $j$ is a wireless protocol index.

A maximum RSSI level may be defined in a technology protocol, for example as −70 dBm. The minimum RSSI level may be defined as well, for example at −110 dBm. RSSI is not the only key performance indicator that may be used to compute link ratings. Link rating may be based on different key performance indicator values besides received signal strength. Alternatively, multiple key performance indicator values may be used in the computation of a link rating. One or more of these performance indicators for links via an AP may be used to compute an interference rating for a given frequency channel within the shared communication frequency band.

In other examples of KPIs that may be used for link rating, link capacity and bit error rates (BER) may be measured. Bit error rate is the ratio of error bits to total bits sent across a wireless link. It is a metric illustrating a signal to noise ratio, which can define the quality of a radio connection for a wireless link. A bit error rate may be a comparison of a sent test stream of data by a transmitter with what is received by a receiver. The bit error rate can be tested by a bit error rate tester in software, which transmits a known bit pattern to or from the mobile information handling system. Pre-error correction errors are counted. A signal-to-interference ratio may also be measured. Such a measurement is based on the power levels for signal transmission (e.g., per bit) relative to interference levels in the received signal. Packet error rate, signal-to-noise measurement, or other signal quality testing is also contemplated. Data packets, such as test packets or active data, may be monitored as it is sent across wireless links to determine packet loss frequencies or resend occurrences for the packets.

At block 512 in an embodiment, the WLAN AP base transceiver location optimization system may identify an optimized radio channel frequency available to the WLAN AP associated with an optimized weighted potential interference across all identified unlicensed small cell WWAN base stations. The WLAN AP base transceiver location optimization system may base the determination of the optimal radio channel frequency for the WLAN AP on key performance indicators (KPI) calculated based upon the potential interference matrix.

At block 514, the WLAN AP base transceiver location optimization system may determine an optimal WLAN AP geographic location associated with an optimized potential interference. As described above, situating BTS systems (including both WLAN AP and unlicensed small cell WWAN base stations) geographically close to one another may yield direct interference among the BTS systems, and may increase roll-off into adjacent radio channel frequencies, causing further interference. As also described above, many installers of WLAN AP base transceiver stations are not technologically proficient enough to identify an optimal geographic location for a WLAN AP operating geographically close to one or more unlicensed small cell WWAN base stations. The WLAN AP base transceiver location optimization system operates to identify the optimal geographic location and communicate that location to the installer, as described in greater detail below.

At block 516, the WLAN AP base transceiver location optimization system in an embodiment may transmit machine-readable code instructions to the WLAN AP to instruct the digital display to display a graphical indicator of a direction pointing toward the optimal geographic location. For example, with reference to FIG. 4, at arrow 414, the WLAN AP base transceiver location optimization system may transmit code instructions to the WLAN AP 202 instructing its digital display 110 to display an arrow 420 indicating a direction (shown here as an arrow) pointing toward the optimal geographic location 408. In another embodiment, the code instructions may instruct the WLAN AP 202 to display the direction indicator without the use of a digital display, such as, for example, by emitting light through an LED element located on a side of the WLAN AP 202 located closest to the optimal geographic location 408. Further, the WLAN AP base transceiver location optimization system may also transmit machine readable code instructions to the WLAN AP instructing it to operate at the optimal radio channel frequency.

Figure 6:
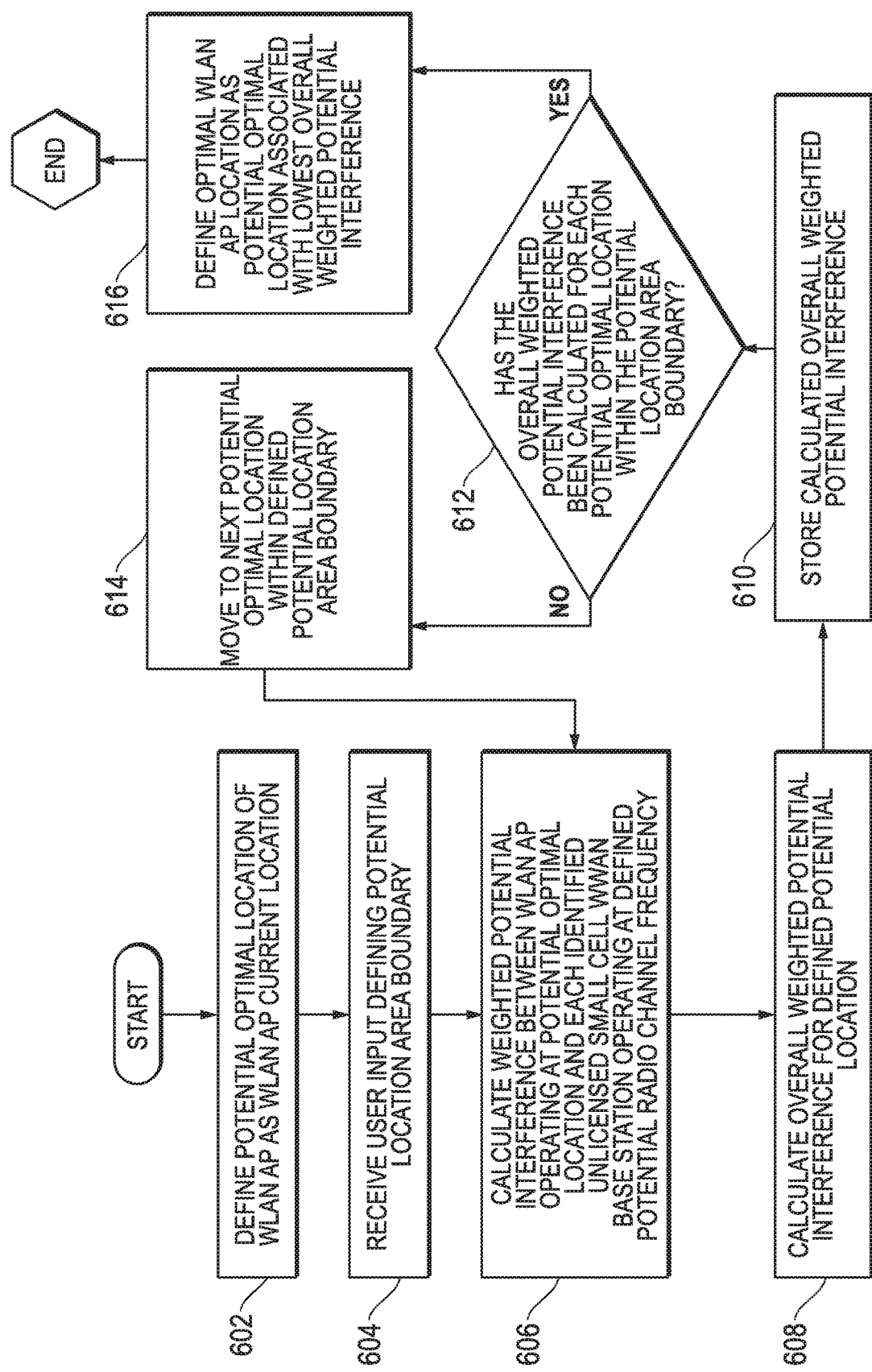
FIG. 6 is a flow diagram illustrating a method of determining an optimal geographic location for a WLAN AP according to an embodiment of the present disclosure.

FIG. 6 is a flow diagram illustrating a method of determining an optimal geographic location for a WLAN AP according to an embodiment of the present disclosure. At block 602, in an embodiment, the WLAN AP base transceiver location optimization system may define the current location of the WLAN AP as a potential optimal location. As described above the WLAN AP base transceiver location optimization system may communicate with the WLAN AP in order to establish the WLAN AP current location. The WLAN AP base transceiver location optimization system may calculate the weighted interference between the WLAN AP and nearby unlicensed small cell WWAN base stations for each of the potential optimized locations in order to determine the optimized location.

At block 604, in an embodiment, the WLAN AP base transceiver location optimization system may receive user input defining a potential location area boundary. The potential location area boundary may define the boundaries of where the WLAN AP installer may install the WLAN AP base transceiver system. For example, if a WLAN AP base transceiver system is operating within a corporate campus, situated beside another corporate campus owned by a separate company, the user may define the boundaries of the potential location for the WLAN AP base transceiver system to exclude any location on the property of the neighbor corporation. In such a way, the WLAN AP base transceiver location optimization system may avoid providing instructions to the installer to install the WLAN AP base transceiver system on property not accessible to the installer. A user may communicate a user input via an input device 112 by, for example, indicating a defined radius from the WLAN AP current location to define a potential location area boundary. As another example, a user may communicate a user input indicating a potential location area boundary by providing GPS coordinates for each edge of the potential location area boundary. As yet another example, a user may carry the WLAN AP base transceiver system as the user walks around the boundaries of the user's property, while relaying updated GPS coordinates of the WLAN AP base transceiver system in order to define the potential location area boundary. These are only a few examples of ways in which a user may input a potential location area boundary and are meant to be illustrative rather than limiting.

At block 606, in an embodiment, a WLAN AP base transceiver location optimization system may calculate a weighted potential interference between the WLAN AP located at the potential optimized location and each identified unlicensed small cell WWAN base station operating at the defined potential radio channel frequency.

In an embodiment, the WLAN AP base transceiver location optimization system may calculate the weighted potential interference between the WLAN AP operating at the potential optimized location and each identified unlicensed small cell WWAN base station operating at the optimized radio channel frequency. As described above, placement of the WLAN AP with respect to the location of each of the unlicensed small cell WWAN base stations may impact the weighted potential interference between the WLAN AP and each of the unlicensed small cell WWAN base stations in an embodiment. As also described above, potential interference between the unlicensed small cell WWAN base stations and the nearby WLAN AP is a function of path loss distance, the operating radio channel frequency of the unlicensed small cell WWAN base station, the operating radio channel frequency of the nearby WLAN AP, and the module type of the other nearby access point. The path loss distance is a function of the geographical distance between the WLAN AP and the nearby unlicensed small cell WWAN base stations.

As also discussed above, the WLAN AP base transceiver location optimization system may have aggregated all necessary data to perform the calculation of potential interference between the WLAN AP and each of the identified unlicensed small cell WWAN base stations. The WLAN AP base transceiver location optimization system may also determine the weighted potential interference between the WLAN AP and the identified unlicensed small cell WWAN base stations by multiplying the potential interference between the WLAN AP and any one of the plurality of unlicensed small cell WWAN base stations by the radio frequency traffic load (represented by a percentage between 0% and 100%) of that one of the plurality of other nearby unlicensed small cell WWAN base stations. Alternatively, as described above, the weighted potential interference may be determined by assuming a radio traffic load of 100% at each of the small cell WWAN base stations. For example, Weighted interference for $AP1=BTS$ Utilization of $AP1*$Potential I/F for $AP1$ wherein the potential I/F for AP1 can be drawn from the potential interference matrix constructed by the WLAN AP base transceiver location optimization system as described above. The WLAN AP base transceiver location optimization system may use the potential interference scores to evaluate the optimal geographic location at which the WLAN AP may operate in order to avoid interference with other nearby access points.

At block 608, in an embodiment the WLAN AP base transceiver location optimization system may calculate the overall weighted potential interference for the defined potential radio channel frequency of the WLAN AP. As described above, the WLAN AP base transceiver location optimization system may calculate the weighted potential interference between each identified unlicensed small cell WWAN base station and the WLAN AP assuming the WLAN AP is operating at the defined potential optimal location. In some embodiments the WLAN AP base transceiver location optimization system may use that information to calculate an overall weighted potential interference the WLAN AP is likely to encounter due to activity at all of the identified unlicensed small cell WWAN base stations operating within the wireless neighbor if the WLAN AP is operating at the defined potential optimal location. For example, the WLAN AP base transceiver location optimization system may calculate the overall weighted potential interference for the defined potential radio channel frequency as the average, weighted potential interferences between each identified unlicensed small cell WWAN base station and the WLAN AP operating at the selected radio channel frequency. Potential interference may be determined according to embodiments described herein such as those techniques described above.

Proceeding to block 610, the WLAN AP base transceiver location optimization system may store the calculated overall weighted potential interference associated with the defined potential optimal location of the WLAN AP. As discussed above, the WLAN AP base transceiver location optimization system may contain a computer readable medium, and may also be operatively connected to a drive unit containing a computer readable medium via a bus. Storage of the calculated overall weighted potential interference for a given defined potential optimal location may allow the WLAN AP base transceiver location optimization system to compare calculated overall weighted potential interference values for various optimal location available to the WLAN AP within the defined potential location area boundary.

At block 612 in an embodiment, the WLAN AP base transceiver location optimization system may determine whether the overall weighted potential interference has been calculated for each available potential optimal location within the defined potential location area boundary. In order to determine the optimal location at which the WLAN AP may operate in order to decrease interference with other base transceiver stations within the wireless neighborhood, the WLAN AP base transceiver location optimization system may perform the calculation of the weighted potential interference between the other base transceiver stations and the WLAN AP for every potential optimal location available to the WLAN AP within the defined potential location area boundary. If the WLAN AP base transceiver location optimization system has not performed the calculation of the overall weighted potential interference for each of the potential optimal locations available to the WLAN AP within the defined potential location area boundary, the method may proceed to block 614. If the WLAN AP base transceiver location optimization system has performed the calculation of the overall weighted potential interference for each of the potential optimal locations available to the WLAN AP, the method may proceed to block 616. Each of the potential optimal locations may include locations selected in four separate directions from the current WLAN AP location in one embodiment. In another embodiment, each of the potential optimal locations may include eight separate directions from the current WLAN AP location. It is understood, any number of potential optimal locations may be selected including just one potential optimal location. In the case of one potential optimal location, selection may be made in a direction opposite from a neighboring BTS operating on a same channel or similar channel in some embodiments.

At block 614, the WLAN AP base transceiver location optimization system may alter the defined potential optimal location of the WLAN AP by choosing another geographic location nearby the current location of the WLAN AP. In an embodiment, this may be in a different direction from the WLAN AP current location than the previous potential optimal location in some embodiments. The WLAN AP base transceiver location optimization system in an embodiment may define the "next potential location" as being a preset distance away from the current location, such as, for example, within three feet. Alternatively, the next potential location in an embodiment may be defined as a proportion of the smallest distance across the user defined potential location area boundary. Any distance may be selected. As yet another example, the next potential location in an embodiment may be defined as a proportion of the lowest measured path loss distance for nearby BTSs as recorded in the neighborhood traffic report. The WLAN AP base transceiver system in an embodiment may perform measurements of the overall weighted potential interference for each of the potential optimal locations within the defined potential location area boundary in a grid-type pattern, or in another preset or user-specified pattern. These examples are meant to be illustrative and should be understood as non-limiting to the present disclosure.

The WLAN AP base transceiver location optimization system may then proceed to calculate and store the overall weighted potential interference between the base transceiver stations in the wireless neighborhood and the WLAN AP operating at newly defined potential optimal location. In such a way, the WLAN AP base transceiver location optimization system may rotate through each potential optimal location available to the WLAN AP within the potential location area boundary in order to determine which available geographic location may be associated with the lowest overall weighted potential interference from base station transceivers operating in the wireless neighborhood.

At block 616 in an embodiment, the WLAN AP base transceiver location optimization system may define the optimal location as the potential optimal location associated with the lowest overall weighted potential interference. As described above, the WLAN AP base transceiver location optimization system may calculate and store the value of the overall weighted potential interference between the base transceiver stations operating in the wireless neighborhood and the WLAN AP operating at each available potential optimal location within the defined potential location area boundary. Once the WLAN AP base transceiver location optimization system has performed this calculation for each potential optimal location available to the WLAN AP, the WLAN AP base transceiver location optimization system may then compare the stored values of each of these calculations to identify the overall weighted potential interference having the lowest value. The WLAN AP base transceiver location optimization system may then identify the potential optimal location associated with that lowest overall weighted potential interference value, and define that potential optimal location as the optimal geographic location at which the WLAN AP may operate in order to avoid interference with activities at the nearby base transceiver stations within the wireless neighborhood.

Figure 7:
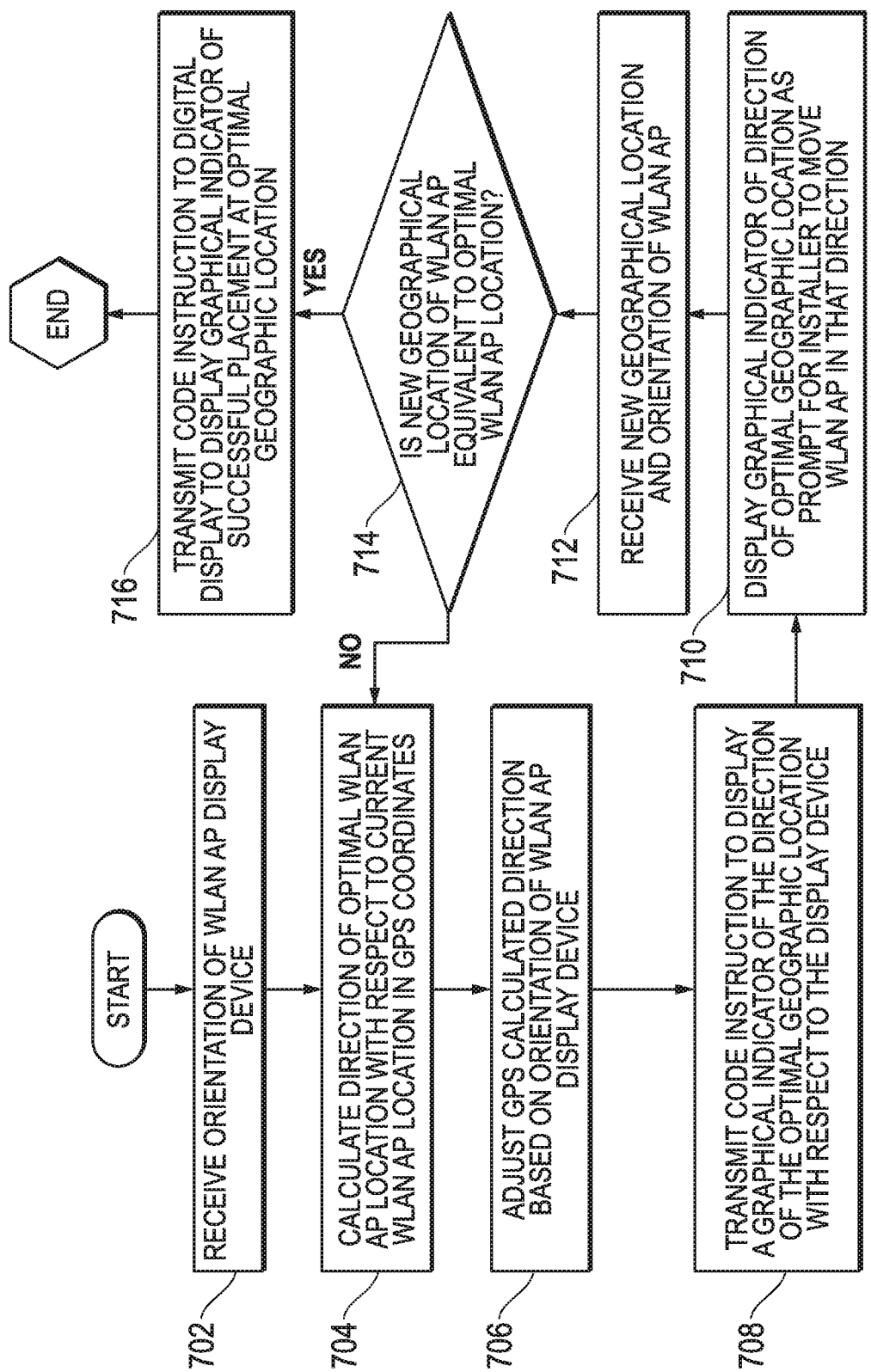
FIG. 7 is a flow diagram illustrating a method of displaying on a WLAN AP digital display a graphical indicator of a direction pointing toward an optimal geographic location.

FIG. 7 is a flow diagram illustrating a method of displaying on a WLAN AP a graphical indicator of a direction pointing toward an optimal geographic location. For example, with reference to FIG. 4, at arrow 414, the WLAN AP digital display 110 may display an arrow 420 indicating a direction pointing toward the optimal geographic location 408. In another embodiment, the WLAN AP 202 may display the direction indicator without the use of a digital display, such as, for example, by emitting light through an LED element located on a side of the WLAN AP 202 located closest to the optimal geographic location 408. The method may include one or more of: receiving information defining the orientation of the WLAN BTS display device, calculating the direction of the optimal WLAN AP location with respect to current WLAN AP location in GPS coordinates, adjusting the GPS calculated direction based on the orientation of the WLAN AP display device, transmitting code instructions to the display device to display a graphical indicator of the direction of the optimal geographic location with respect to the display device at the given orientation and current location, displaying the graphical indicator prompting the user to move the WLAN AP base transceiver in the direction of the optimal geographic location with respect to the display device at the given orientation and current location, receiving a new geographical location and orientation of the digital display of the WLAN AP, repeating this process until the new geographical location of the WLAN AP is equivalent to the optimal WLAN AP location, and once the new geographical location of the WLAN AP is equivalent to the optimal WLAN AP location, transmitting code instructions to the digital display to display a graphical indicator of successful placement of the WLAN AP at the optimal geographic location.

At block 702, in an embodiment, the WLAN AP base transceiver location optimization system may receive information indicating the orientation of the WLAN AP display device. As described above, the information handling system may include a device orientation sensor, such as, for example, an accelerometer or geomagnetic field sensor, which determines the orientation of the digital display, or the orientation of other display devices (including LED elements located on each side of the WLAN AP) with respect to one another.

At block 704, in an embodiment, the WLAN AP base transceiver location optimization system may calculate the direction of the optimal WLAN AP location with respect to the current WLAN AP location in GPS coordinates. As described above, the WLAN AP base transceiver location optimization system may determine the GPS coordinates of the optimal WLAN AP location selected by modeling and comparing the weighted potential interference at one or more potential optimal locations within a range of the WLAN AP current location. The WLAN AP base transceiver location optimization system in an embodiment may receive the current GPS coordinates of the WLAN AP base transceiver system. The WLAN AP base transceiver location optimization system may calculate the direction of the optimal geographic location from the current location using these GPS coordinates, in order to yield a direction in GPS coordinate space. However, as described above, in order to display an indicator of this direction on the digital display, the WLAN AP base transceiver location optimization system in an embodiment may first need to compensate for the orientation of the digital display.

At block 706, in an embodiment, the WLAN AP base transceiver location optimization system may adjust the calculated GPS direction based on the orientation of the WLAN AP display device. Both the calculated GPS direction and the orientation of the WLAN AP display device describe a fixed position in a three-dimensional space. However, the center point of the GPS coordinate system may differ from the center point of the display device orientation coordinate system in an embodiment. Thus, the WLAN AP base transceiver location optimization system in an embodiment may translate the coordinates of the optimal geographic location from the three-dimensional space having the center point of the GPS coordinate system to coordinates in the three-dimensional space having the center point of the orientation of the display device. The WLAN AP base transceiver location optimization system may use one of many well known mathematical techniques for performing this translation, including, but not limited to the use of rotational matrices and/or quaternions.

At block 708, in an embodiment, the WLAN AP base transceiver location optimization system may transmit code instructions to the WLAN AP digital display to display a graphical indicator of the direction of the optimal geographic location with respect to the display device. As an example, the code instructions may instruct a digital display to display a graphical indicator pointing in the direction of the optimal geographic location, as given in the digital display orientation coordinate system.

As also described above, with respect to FIG. 4, the digital display 110 of the WLAN AP 202 may display an arrow 420 that indicates the direction in which the optimal geographic location 408 lies, with reference to the digital display 110. In another embodiment, the WLAN AP 202 may display the direction indicator without the use of a digital display, such as, for example, by emitting light through an LED element located on a side of the WLAN AP 202 located closest to the optimal geographic location 408. In order to display this arrow 420 or to emit light from a specific LED element, the WLAN AP base transceiver location optimization system must first determine the orientation of the digital display 110 or orientation of LED elements with respect to one another in order to ensure the arrow 420 points in the direction of the optimal geographic location or that the appropriate LED element lights up. For example, in FIG. 4, the front edge of the digital display 110 is oriented NE of the center of the digital display 110, and as such, the arrow 420 is displayed as pointing to about 9:00 with respect to the digital display 110. However, if the front edge of the digital display 110 were oriented SW of the center of the digital display 110, the arrow 420 would need to be displayed as pointing to about 3:00 in order to point in the direction of the optimal geographic location 408. The WLAN AP base transceiver location optimization system may receive the orientation of the WLAN AP digital display as measured by the device orientation sensor.

At block 710, in an embodiment, the WLAN AP digital display may display the graphical indicator of the direction of the optimal geographic location as a prompt for the installer to move the WLAN AP device in that direction. As an example, and as shown in FIG. 4, the WLAN AP 202 digital display 110 may display the arrow 420 pointing toward the optimal geographic location 408, as a way to prompt the installer to move the WLAN AP 202 toward the optimal geographic location 408. In another embodiment, the WLAN AP 202 may display the direction indicator without the use of a digital display, such as, for example, by emitting light through an LED element located on a side of the WLAN AP 202 located closest to the optimal geographic location 408, as a way to prompt the installer to move the WLAN AP 202 toward the optimal geographic location 408.

At block 712, in an embodiment, the WLAN AP base transceiver location optimization system may receive a new geographical location and orientation of the WLAN AP. As described above, the display of the graphical indicator, as shown in FIG. 4 may prompt the installer to move the WLAN AP 202 toward the optimal geographic location 408. If the installer does, in fact, move the WLAN AP 202, the installer may also alter the orientation of the digital display 110. For example, the installer may rotate the digital display 110 such that the front edge of the digital display is pointing toward the optimal geographic location 408. In such a circumstance, the WLAN AP base transceiver location optimization system in an embodiment may receive a new geographical location and orientation of the WLAN AP.

At block 714, in an embodiment, the WLAN AP base transceiver location optimization system determines whether the new geographical location of the WLAN AP is equivalent to the optimal WLAN AP location. If the new geographical location of the WLAN AP is not equivalent to or within an acceptable deviation from the optimal WLAN AP location, the WLAN AP base transceiver location optimization system may return to block 704. If the new geographical location of the WLAN AP is equivalent to the optimal WLAN AP location, the WLAN AP base transceiver location optimization system may transmit a machine-readable code instruction to the WLAN AP digital display to display a graphical indicator of successful placement of the WLAN AP at the optimal geographic location. For example, the WLAN AP digital display in an embodiment may display a green light, a flashing light, a backlit thumbs up, or a written message indicating the placement has been successful. In another embodiment, LED elements incorporated within the WLAN AP 202 may display a green light or flash on and off. In such a way, the WLAN AP base transceiver location optimization system may operate to identify an optimal geographic location of a WLAN AP and communicate that location to installers having varying degrees of technical proficiency in such a way as to allow installers of any proficiency level to successfully place the WLAN AP at the optimal geographic location to decrease the effects of interference from nearby BTSs.

In some embodiments, dedicated hardware implementations such as application specific integrated circuits, programmable logic arrays and other hardware devices can be constructed to implement one or more of the methods described herein or portions of one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionality as described herein.

When referred to as a "device," a "module," or the like, the embodiments described herein can be configured as hardware. For example, a portion of an information handling system device may be hardware such as, for example, an integrated circuit (such as an Application Specific Integrated Circuit (ASIC), a Field Programmable Gate Array (FPGA), a structured ASIC, or a device embedded on a larger chip), a card (such as a Peripheral Component Interface (PCI) card, a PCI-express card, a Personal Computer Memory Card International Association (PCMCIA) card, or other such expansion card), or a system (such as a motherboard, a system-on-a-chip (SoC), or a stand-alone device). The device or module can include software, including firmware embedded at a device, such as an Intel® Core™ or ARM® RISC brand processors, or other such device, or software capable of operating a relevant environment of the information handling system. The device or module can also include a combination of the foregoing examples of hardware or software. Note that an information handling system can include an integrated circuit or a board-level product having portions thereof that can also be any combination of hardware and software.

Devices, modules, resources, or programs that are in communication with one another need not be in continuous communication with each other, unless expressly specified otherwise. In addition, devices, modules, resources, or programs that are in communication with one another can communicate directly or indirectly through one or more intermediaries.

Although only a few exemplary embodiments have been described in detail herein, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

What is claimed is:

1. An information handling system configured to operate as a WWAN access point (AP) comprising:
at least one wireless adapter for communicating on a radio channel frequency within a shared communication frequency band;
an application processor receiving reported location interference and traffic levels, path loss assessment levels, and base transceiver utilization assessment levels for a plurality of wireless links from the at least one wireless adapter and a plurality of neighboring small cell WWAN base stations and the plurality of Wi-Fi access points for use in determining weighted potential interference levels;
the application processor executing code instructions to select an optimal geographic location of the information handling system relative to the plurality of Wi-Fi access points and the plurality of neighboring small cell WWAN base stations by:
determining a first weighted potential interference level between the information handling system and the plurality of neighboring small cell WWAN base stations and the plurality of Wi-Fi access points operating at the radio channel frequency at a first geographic location;
determining a second weighted potential interference level between the information handling system and the plurality of neighboring small cell WWAN base stations and the plurality of Wi-Fi access points operating at the radio channel frequency at a second geographic location that is a candidate optimal geographic location;
defining the second geographic location as the optimal geographic location of the information handling system to operate as the WWAN AP when the second weighted potential interference level is less than the first weighted potential interference level; and
a digital display notifying a user of the optimal geographic location relative to the first geographic location.

2. The information handling system of claim 1 further comprising:
the application processor determining a plurality of weighted potential interference levels in addition to the first weighted potential interference level for a plurality of wireless links operating on the radio channel frequency at one of a plurality of additional geographic locations that are candidate optimal geographic locations;

identifying one of the plurality of weighted potential interferences as having the lowest value; and defining the geographic location associated with the one of the plurality of weighted potential interferences having the lowest value as the optimal geographic location of the information handling system configured to operate as the WWAN AP.

3. The system of claim 1, wherein the application processor generates the first and second weighted potential interferences based on a collection of wireless traffic reports of the spatial-temporal radio frequency profile, each wireless traffic report describing at least position, radio channel frequency of transmission, and traffic at each of a plurality of unlicensed small cell WWAN base stations and the plurality of Wi-Fi access points operating within scanning distance of the information handling system configured to operate as the WWAN AP.

4. The system of claim 3, wherein the application processor generates the first and second weighted potential interferences based on measured or predicted channel occupancy of neighboring base transceiver systems operating in a candidate channel frequency.

5. The system of claim 1, further comprising:
the application processor determining an updated geographic location of the information handling system configured to operate as the WWAN AP after movement, and determining a direction of further movement to the optimal geographic location from the updated geographic location; and
the digital display displaying a graphical indicator of the direction of further movement to the optimal geographic location from the updated geographic location.

6. The system of claim 5, further comprising, the application processor iteratively repeating the determination of the updated geographic location relative to the optimal geographic location until the updated geographic location matches the optimal geographic location.

7. The system of claim 1, wherein the processor notifies the user when the geographic location of the information handling system configured to operate as the WWAN AP matches the optimal geographic location.

8. A method for channel and location optimization for a WWAN AP comprising:
receiving, via a wireless adapter, reported location interference and traffic levels, path loss assessment levels, and base transceiver utilization assessment levels for a plurality of wireless links from the at least one wireless adapter and a plurality of neighboring small cell WWAN base stations and a plurality of Wi-Fi access points for use in determining weighted potential interference levels;
determining, via an application processor, a first weighted potential interference level between the information handling system and the plurality of neighboring small cell WWAN base stations and the plurality of Wi-Fi access points operating at the radio channel frequency at a first geographic location and a second weighted potential interference level between the information handling system and the plurality of neighboring small cell WWAN base stations and the plurality of Wi-Fi access points operating at the radio channel frequency at a second geographic location that is a candidate optimal geographic location;
selecting the second geographic location as an optimal geographic location of the WWAN AP when the second weighted potential interference level is less than the first weighted potential interference level; and
displaying a graphical indicator of the direction of the optimal geographic location from the first geographic location.

9. The method for channel and location optimization for a WWAN AP of claim 8 further comprising:
determining a plurality of weighted potential interference levels in addition to the first weighted potential interference level for a plurality of wireless links operating on the radio channel frequency at one of a plurality of additional geographic locations that are candidate optimal geographic locations; and
selecting one of the plurality of weighted potential interference levels having the lowest value as the optimal geographic location of the WWAN AP.

10. The method for channel and location optimization for the WWAN AP of claim 8, wherein the first and second weighted potential interferences are generated based on a collection of wireless traffic reports of the spatial-temporal radio frequency profile, each wireless traffic report describing at least position, radio channel frequency of transmission, and traffic at each of a plurality of unlicensed small cell WWAN base stations and Wi-Fi access points operating within scanning distance of the WWAN AP.

11. The method for channel and location optimization for the WWAN AP of claim 10, wherein the first and second weighted potential interferences are generated based on measured or predicted channel occupancy of neighboring base transceiver systems operating in a candidate channel frequency.

12. The method for channel and location optimization for the WWAN AP of claim 8, further comprising:
determining an updated geographic location of the WWAN AP after movement of the WWAN AP, and determining a direction of further movement to the optimal geographic location from the updated geographic location; and
displaying a graphical indicator of a direction of further movement to the optimal geographic location from the updated geographic location.

13. The method for channel and location optimization for the WWAN AP of claim 12, further comprising iteratively repeating the determination of the updated geographic location and the direction of the optimal geographic location from the updated geographic location until the updated geographic location matches the optimal geographic location.

14. The method for channel and location optimization for the WWAN AP of claim 8, wherein the processor notifies a user when the geographic location of the WWAN AP matches the optimal geographic location.

15. An information handling system configured to operate as a WWAN access point (AP) comprising:
at least one wireless adapter for communicating on a radio channel frequency within a shared communication frequency band;
an application processor receiving reported location interference and traffic levels, path loss assessment levels, and base transceiver utilization assessment levels for a plurality of wireless links from the at least one wireless adapter and a plurality of neighboring small cell WWAN base stations and a plurality of Wi-Fi access points for use in determining weighted potential interference levels;

an application processor executing code instructions to select an optimal geographic location of the information handling system relative to a plurality of Wi-Fi access points and the plurality of neighboring small cell WWAN base stations by:

determining a first weighted potential interference level between the information handling system and the plurality of neighboring small cell WWAN base stations and the plurality of Wi-Fi access points operating at the radio channel frequency at a first geographic location and a plurality of candidate weighted potential interference level between the information handling system and the plurality of neighboring small cell WWAN base stations and the plurality of Wi-Fi access points operating at the radio channel frequency at a plurality of additional geographic locations that are candidate optimal geographic locations;

comparing the first weighted potential interference level with the candidate weighted potential interference levels;

selecting the optimal geographic location of the information handling system to operate as the WWAN AP as the lowest weighted potential interference level; and notifying a user where the optimal geographic location is relative to the first geographic location.

16. The information handling system of claim 15 further comprising:

selecting the first geographic location if the first weighted potential interference level has the lowest value as the optimal geographic location of the information handling system configured to operate as the WWAN AP.

17. The system of claim 15, wherein the application processor generates the first weighted potential interference level and plurality of candidate weighted potential interference levels based on a collection of wireless traffic reports of the spatial-temporal radio frequency profile, each wireless traffic report describing at least position, radio channel frequency of transmission, and traffic at each of a plurality of unlicensed small cell WWAN base stations and Wi-Fi access points operating within scanning distance of the information handling system configured to operate as the WWAN AP.

18. The system of claim 17, wherein the application processor generates the first and second weighted potential interference level and the plurality of candidate weighted potential interference levels based on measured or predicted channel occupancy of neighboring base transceiver systems operating in a candidate channel frequency.

19. The system of claim 15, further comprising the application processor receiving an updated geographic location of the information handling system configured to operate as the WWAN AP after movement, determining a direction of further movement to the optimal geographic location from the updated geographic location, and transmitting notification to the user that the optimal geographic location of the direction of the optimal geographic location from the updated geographic location.

20. The system of claim 19, further comprising, the application processor repeating the determination of the updated geographic location and the direction of the optimal geographic location from the updated geographic location until the updated geographic location matches the optimal geographic location.

* * * * *